US012792845B2

(12) United States Patent
Molitor et al.

(10) Patent No.: US 12,792,845 B2
(45) Date of Patent: Nov. 10, 2026

(54) ARTIFICIAL INTELLIGENCE (AI) BASED INTERFACE SYSTEM

(71) Applicant: Microsoft Technology Licensing, LLC, Redmond, WA (US)

(72) Inventors: Stacy Jewell Molitor, Anacortes, WA (US); Dany Khalife, Bellevue, WA (US); Shuyao Qi, Redmond, WA (US); Jakob Anders Moberg, North Bend, WA (US); Aaron Patrick Shepherd, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 559 days.

(21) Appl. No.: 18/336,403

(22) Filed: Jun. 16, 2023

(65) Prior Publication Data

US 2024/0419922 A1 Dec. 19, 2024

(51) Int. Cl.

| | |
|---|---|
| ***G06F 40/40*** | (2020.01) |
| ***G06F 3/0484*** | (2022.01) |
| ***G06F 40/166*** | (2020.01) |
| ***G06F 40/247*** | (2020.01) |

(52) U.S. Cl.

CPC ............ *G06F 40/40* (2020.01); *G06F 3/0484* (2013.01); *G06F 40/166* (2020.01); *G06F 40/247* (2020.01)

(58) Field of Classification Search

CPC ...... G06F 40/40; G06F 40/166; G06F 40/247; G06F 3/0484

See application file for complete search history.

(56) References Cited

U.S. PATENT DOCUMENTS

| | | | | |
|---|---|---|---|---|
| 2015/0278171 | A1* | 10/2015 | Lefebvre ................. | H04W 4/50 715/760 |
| 2019/0342248 | A1* | 11/2019 | Thompson ........... | G06Q 10/107 |
| 2020/0111060 | A1* | 4/2020 | Yang ...................... | H04M 1/725 |
| 2021/0241600 | A1* | 8/2021 | Kim ............... | G06Q 10/063114 |
| 2022/0058562 | A1* | 2/2022 | Swaminathan ....... | G06F 16/958 |
| 2022/0084511 | A1* | 3/2022 | Nickson ................ | G10L 15/063 |
| 2023/0153546 | A1* | 5/2023 | Peleg ...................... | G06F 40/56 704/9 |

* cited by examiner

*Primary Examiner* — Bhavesh M Mehta
*Assistant Examiner* — Edward Tracy, Jr.
(74) *Attorney, Agent, or Firm* — NovoTechIP International PLLC

(57) ABSTRACT

Systems and methods for providing an artificial intelligence (AI)-based interface for an application include receiving a prompt from a user interface (UI) component of an interface client that defines at least one task to be performed in the application. The prompt is supplied to at least one language model as input. The at least one language model is trained to process the prompt to identify the at least one task to be performed, generate new content if required by the at least one task, and domain-specific instructions for causing the tasks to be performed in the notes application. Notes domain-specific language (NDSL) instructions are provided as output to the notes application where they are executed in the notes application to perform the at least one task.

20 Claims, 13 Drawing Sheets

ARTIFICIAL INTELLIGENCE (AI) BASED INTERFACE SYSTEM

BACKGROUND

Note-taking applications have become an essential tool for anyone looking to stay organized and productive in today's digital world. With the rapid advancement of technology, these applications have evolved far beyond traditional pen and paper methods, offering a wide range of features and capabilities that make note-taking more efficient and effective. For example, many note-taking applications enable information in the form of text, images, audio/video recordings, web clippings, document attachments, and the like to be easily captured, searched, and shared. Note-taking applications also typically have features that facilitate organizing and editing notes. For example, applications often enable notes to be organized using pages, notebooks, folders, tags, and the like and have options for formatting text, drawing shapes, and arranging information in notes.

However, while note-taking applications may have many of the same features for organizing and editing notes, different applications often implement these features in different ways. As a result, different note-taking applications typically have different user interface controls, keyboard shortcuts, and interface elements for controlling the functionality of the application. This can make it difficult for a user to switch from one application to another which may be required in some cases, such as when changing jobs, and create a barrier to adoption of the application by new users. In addition, note-taking applications may have features that a user is not aware of and/or does not know how to use. This problem can be exacerbated as applications are updated to include new and, in some cases, more advanced features. As a result, users often do not know how to take full advantage of the functionality of a given application.

Finding ways to interface with applications that can facilitate and simplify interactions without requiring intimate knowledge of application controls and/or features is therefore a worthwhile endeavor.

SUMMARY

In one general aspect, the instant disclosure presents an artificial intelligence (AI)-based interface system for a notes application having a processor and a memory in communication with the processor wherein the memory stores executable instructions that, when executed by the processor alone or in combination with other processors, cause the AI-based interface system to perform multiple functions. The functions receiving a prompt via a user interface (UI) component of an interface client, the prompt defining at least one task to be performed in the notes application; sending, over a communication network, the prompt to an AI notes interface including at least one language model, the prompt being provided to at least one language model as input, the at least one language model being trained to process the prompt to identify the at least one task to be performed and to generate notes domain-specific language (NDSL) instructions for execution in the notes application to perform the task, the at least one language model providing the NDSL instructions as an output, the NDSL instructions being based on a NDSL framework implemented for the notes application; receiving, over the communication network, the output including the NDSL instructions from the at least one language model; and executing the NDSL instructions using a NDSL handler in the notes application to perform the at least one task indicated by the prompt.

In yet another general aspect, the instant disclosure presents a method for providing an artificial intelligence (AI)-based interface for a notes application. The method includes receiving a prompt via a user interface (UI) component of an interface client, the prompt being in a natural language format and defining at least one task to be performed in the notes application; sending, over a communication network, the prompt to an AI notes interface including at least one language model, the prompt being provided to at least one language model as input, the at least one language model being trained to process the prompt to identify the at least one task to be performed and to generate notes domain-specific language (NDSL) instructions for execution in the notes application to perform the task, the at least one language model providing the NDSL instructions as an output, the NDSL instructions being based on a NDSL framework implemented for the notes application; receiving, over the communication network, the output from the at least one language model including the NDSL instructions; and executing the NDSL instructions using a NDSL handler in the notes application to perform the at least one task indicated by the prompt.

In a further general aspect, the instant application describes a non-transitory computer readable medium on which are stored instructions that when executed cause a programmable device to perform functions of receiving a prompt via a user interface (UI) component of an interface client, the prompt being in a natural language format and defining at least one task to be performed in a notes application; sending, over a communication network, the prompt to an AI notes interface including at least one language model, the prompt being provided to at least one language model as input, the at least one language model being trained to process the prompt to identify the at least one task to be performed and to generate notes domain-specific language (NDSL) instructions for execution in the notes application to perform the task, the at least one language model providing the NDSL instructions as an output, the NDSL instructions being based on a NDSL framework implemented for the notes application; receiving, over the communication network, the output from the at least one language model including the NDSL instructions; and executing the NDSL instructions using a NDSL handler in the notes application to perform the at least one task indicated by the prompt.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
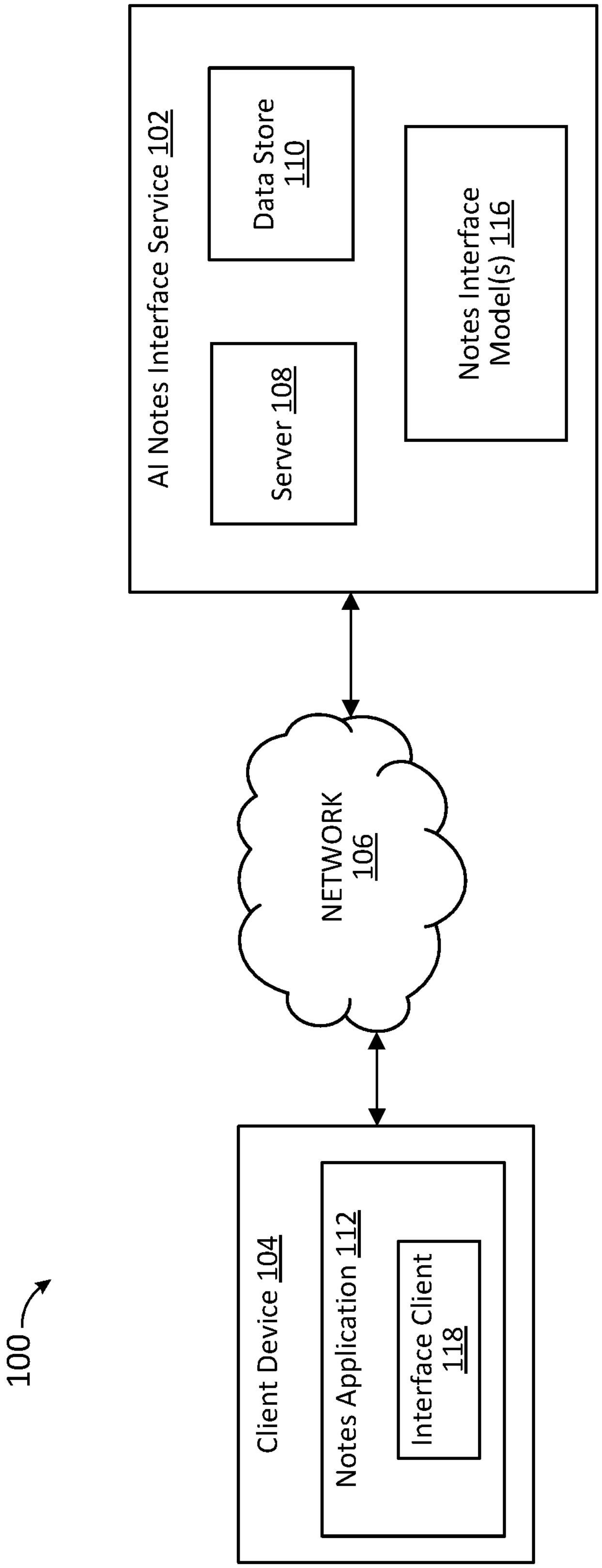
FIG. 1 depicts an example system upon which aspects of this disclosure may be implemented.

Note-taking applications have features that facilitate creating, organizing, editing, and sharing notes. For example, note-taking applications often enable notes to be created by typing text, handwriting, drawing shapes, adding images, recording audio/video, attaching documents, and clipping information from web pages. These applications also typically enable this information to be formatted, edited, and arranged in many ways and provide some type of organizational infrastructure through the use of pages, notebooks, folders, tags, and the like.

However, different notes applications typically have different user interface (UI) controls, keyboard shortcuts, and interface elements for controlling the functionality of the application which can make it difficult for users to switch applications if required and create a barrier to adoption for new users. In addition, some notes applications may have features that a user is not aware of and/or does not know how to use. As a result, users often do not know how to take full advantage of the functionality of a given application. This technical problem can be exacerbated as applications are updated to include new and, in some cases, more advanced features.

To address these technical problems and more, in an example, this description provides a technical solution in the form of an AI-based notes application interface tool, referred to herein as an AI notes application interface, designed specifically for use with a notes application that enables users to utilize all of the functionality of the application using natural language text, referred to herein as a prompt. As used herein, a notes application is an application for receiving and storing information. Information can take the form of text, images, audio/video recordings, web clippings, document attachments, and the like, collectively referred to herein as "content." A notes application implements an organization scheme to facilitate storage, organization, and retrieval of notes. In embodiments, the notes application utilizes a hierarchical scheme that uses notebook, sections, and pages. A notebook can be designated for storing information and content related to a high-level topic. Each notebook can have one or more sections for collecting information pertaining to sub-topics. Each section in turn can have any number of notes, or pages, where the actual information is stored. A note or page includes a canvas area for receiving and storing information. Content can be added to the canvas area of a note in a number of ways, such as by typing, writing, copying and pasting, recording audio and/or video, dragging and dropping, uploading content, clipping content from web pages, adding attachments, etc. The canvas area allows content to be positioned, moved, and rearranged as needed. The notes application includes various formatting options for modifying content, such as font, font size, font color, and background color, and enable content to be organized within a canvas area in a number of ways, such as bulleted/numbered lists, outlines, tables, etc.

The AI notes application interface leverages at least one language model to provide assistance in handling a variety of notes application tasks by connecting user input and prompt output, suggesting next steps to the user, and providing a conversational flow for content creation in the application. A language model is a machine learning model that is trained using large amounts of language data to recognize, summarize, translate, predict and/or generate text and other content. Language models can be trained to process natural language, write code, generate conversational responses, suggest actions, and the like. Any suitable type of language model may be used including statistical models (e.g., n-gram models) and/or deep neural models (e.g., neural language models). In embodiments, the language model comprises a large language model (LLM). Examples of LLMs include, but are not limited to, generative models, such as Generative Pre-trained Transformer (GPT)-based models, e.g., GPT-3, GPT-4, ChatGPT, and the like.

A user provides a prompt as input to the AI notes application interface via a UI element, e.g., by typing, writing, speaking etc., and the prompt is provided to a notes interface model as input. The prompt can be written in natural language and can include instructions for one or more tasks to be performed in an application, such as create a new note about a certain topic, summarize the content of a page, organize the content of a page, rewrite text/content in a different manner (e.g., more precise, more positive, etc.), change the style and/or format of elements of a note, etc. The notes interface model is a language model, such as an LLM, statistical model, neural model, generative model, and the like trained to process the natural language input to identify tasks to be performed and to generate application-specific instructions/code to carry out those tasks. Application-specific instructions/code comprises executable code written in a notes domain-specific language (NDSL) that has been created for a specific notes application and is designed to enable the features and functionality of the notes application to be accessed and controlled from outside of the application. The NDSL is based on a NDSL framework for the notes application that defines the terminology, functions, variables, syntax, protocols, etc. that enable interactions with the notes application. In one specific example, the notes application is Microsoft OneNote®, and the NDSL is referred to as OneNote Office Specific Domain Language (ODSL).

The notes interface model processes the prompt to determine the tasks that need to be performed, and the notes application features/functions that can be used to perform the tasks. For example, a prompt may be written as "Create a notebook for recipes." The notes interface model determines that a notebook needs to be created with the name "Recipes." The notes interface model is trained to generate the NDSL instructions/code that will, when executed, cause the notes application to create a notebook named "Recipes." Prompts provided by users can include substantially any task that can be performed using a feature and/or function of the notes application. Examples of such tasks include creating notebooks, sections in notebooks, pages in sections, formatting and manipulating content in various ways, etc. The notes interface model is also configured to assist with content creation and transformation tasks. For example, the notes interface model may be trained to create content by retrieving content from the internet (e.g., articles, images, web pages, etc.), writing passages about a given topic, finding synonyms for words, and the like. The notes interface model may also be trained to transform content by, for example, organizing content, summarizing textual content, rewriting textual content in different styles and/or tones (e.g., precision, positivity, more verbose, academic sounding, etc.), finding synonyms for words, and the like. The notes interface model is trained to generate NDSL instructions/code that enables new content that has been retrieved and/or generated to be added to specified note(s) or page(s) of the notes application. The notes interface model is also trained to generate NDSL instructions/code for accessing specified notes or pages and transforming/manipulating the content of the notes in a specified manner (e.g., summarizing, rewriting, splitting, etc.).

In embodiments, a language model may be trained to identify keywords in prompts which are indicative of desired tasks to be performed and match the keywords to functionality in the notes application capable of achieving the desired tasks and in turn to NDSL instructions for implementing the functionality. For example, a prompt may be written as "Create a notebook for recipes." The notes interface model identifies the keywords "create" and "notebook" as well as "named" and determines that the notes application functionality of creating a notebook and naming/renaming a notebook can be used to achieve this task. NDSL instructions for creating a notebook and naming the notebook "Recipes" can then be generated. As another example, a prompt may read "Organize this page." The language model processes the natural language of the prompt and identifies the keywords "organize" and "page," In this case, there may be many ways to organize a page. The language model is trained to analyze various aspects of the current page, such as the current content, types of content, arrangement of content, formatting of content, etc., and identifies a strategy for organizing the content which takes various factors, such as readability, viewability, consistency, and the like, as well as the capabilities of the notes application, into consideration in devising the strategy. The language model can then determine what actions or sequence of actions are needed to implement the strategy which may include for example, grouping related content, aligning objects, using consistent formatting/styles, etc. The language model can then select the application functionality needed to perform these actions and generate the appropriate NDSL instructions to access the functionality and perform the actions in the notes application.

In some embodiments, natural language processing tasks. NDSL instruction generating tasks, and content creation and manipulation tasks are performed by a single language model that has been trained to perform all of these tasks. In other embodiments, multiple language models are provided for performing different tasks for the AI notes interface. For example, in some embodiments, one language model is trained to parse and understand natural language text in order to function as the primary interface between a user and the other AI of the system. One or more other language models are used to perform other tasks for the interface, such as generating NDSL instructions, retrieving/generating new content, suggesting next actions, and the like. In these embodiments, the language model that is trained as the primary interface is also trained to interact with the other models, e.g., by generating the appropriate prompts to supply to the models and to generate NDSL instructions using the output of the other models. In one implementation, a first language model is trained to process natural language prompts and a second language model is used to generate new content for the notes application. The first language model in this case is also trained to determine whether a prompt requires generation of new content and to generate prompts for the second language model as needed.

In embodiments, in addition to processing the natural language of the prompt to identify tasks and content requirements, a notes interface model can provide suggestions for subsequent tasks to be performed in the application. For example, a language model can be trained to learn frequently performed tasks, related tasks, task sequences, and the like and use this information to generate task suggestions which can be presented to the user via a UI. For example, a language model can determine that new content is often rewritten to change the tone of the content, such as by making the content more precise, more positive, and the like. The language model can then provide a suggestion, such as by presenting a message in the UI which states, for example, "Rewrite the text to sound more positive". In embodiments, suggestions in the UI can be clicked on, or otherwise actuated, to cause the suggested task to be performed by the language model. In embodiments, suggestions can also include suggesting new features to try and/or demonstrate in the application.

The technical solutions described herein provide an AI-based notes application interface that facilitates the creation, modification and organization of content in a notes application by leveraging the features and functionality that a notes application already has and augmenting it with AI from language models that enables the features and functionality of the notes application to be accessed and controlled using natural language and conversational interactions with language models. The UI of the notes application is therefore improved by not requiring intimate knowledge of purpose and location of UI controls.

FIG. 1 shows an example computing environment 100 in which aspects of the disclosure can be implemented. Computing environment 100 includes an AI notes interface service 102 and a client device 104 which communicate with each other via a network 106. The network 106 includes one or more wired, wireless, and/or a combination of wired and wireless networks. In embodiments, the network 106 includes one or more local area networks (LAN), wide area networks (WAN) (e.g., the Internet), public networks, private networks, virtual networks, mesh networks, peer-to-peer networks, and/or other interconnected data paths across which multiple devices may communicate. In embodiments, the network 106 is coupled to or includes portions of a telecommunications network for sending data in a variety of different communication protocols. In some implementations, the network 106 includes Bluetooth® communication networks or a cellular communications network for sending and receiving data including via short messaging service (SMS), multimedia messaging service (MMS), hypertext transfer protocol (HTTP), direct data connection. WAP, email, and the like.

The AI notes interface service 102 is implemented as a cloud-based service or set of services. To this end. AI notes interface service 102 includes at least one server 108 which is configured to provide computational and/or storage resources for implementing the application service 102. The server 108 is representative of any physical or virtual computing system, device, or collection thereof, such as, a web server, rack server, blade server, virtual machine server, or tower server, as well as any other type of computing system. In embodiments, the application server 108 is implemented in a data center, a virtual data center, or some other suitable facility. Server 108 executes one or more software applications, modules, components, or collection thereof capable of providing the interface service to clients, such as client device 104. Program code, instructions, user data and/or content for the application service is stored in a data store 110. Although a single server 108 and data store 110 are shown in FIG. 1. AI-based interface service 102 may utilize any suitable number of servers and/or data stores.

Client device 104 comprises any suitable type of computing device, such as personal computers, desktop computers, laptop computers, mobile telephones, smart phones, tablets, phablets, smart watches, wearable computers, gaming devices/computers, televisions, and the like. Client device 104 includes a notes application 112 with which the AI notes interface service 102 is designed to work. In embodiments, content (e.g. notes) created by application 112 is stored locally at client device or stored in a cloud-based storage system (not shown). In other embodiments, the application 112 is a web browser that accesses a web-based notes application (not shown) via the network 106. The notes application 112 includes an interface client 118 for receiving prompts from a user and providing the prompts to the AI notes interface service 102 where it is provided as input to the notes interface model(s) 116. The interface client 118 includes a software application, module, component, or collection thereof capable of interacting with the application assistance service 102 (explained in more detail below). In one embodiment, as shown in FIG. 1, the interface client 118 is implemented as an integrated feature or component of application 112, such as a plug-in or add-in. In other embodiments, the interface client 118 is implemented as a standalone software application programmed to communicate and interact with the application assistance service 102.

The interface client 118 is used to generate a UI component for receiving user input from a user that is entered using a user input device, such as a keyboard, mouse, touch screen, stylus, microphone, etc. The prompt includes a text string that is in a natural language format. The prompt includes one or more tasks to be performed in the notes application. The tasks that can be performed depend in part on the capabilities and configuration of the notes application 112, such as how notes are organized or stored (e.g., freeform, folders, notebooks, sections, stacks, lists, outlines, pages, notes, etc.), the type of information that can be kept (e.g., plain text, rich text, images, tables, web pages, etc.), formatting features, and the like. The interface client 118 communicates prompts to the notes interface service 102 via the network 106 where it is supplied to the notes interface model(s) 116 as an input.

The AI notes interface service 102 includes at least one notes interface model 116 trained to process natural language prompts received from the interface client 118 in order to identify tasks to be performed, to generate new content as needed by the tasks, and to generate NDSL instructions for causing the tasks to be performed in the notes application. In addition, to NDSL instructions, the notes interface model 116 is trained to generate responsive text for responding to prompts in a conversational manner. In embodiments, notes interface model 116 is also trained to suggest subsequent actions to be performed based on the task(s) currently being performed. NDSL instructions, responsive text, and suggested actions are returned to the interface client 118 where NDSL instructions are executed to perform the task(s) indicated by the prompt and responsive text and suggested actions are presented to the user via the UI component of the interface client 118.

Figure 2:
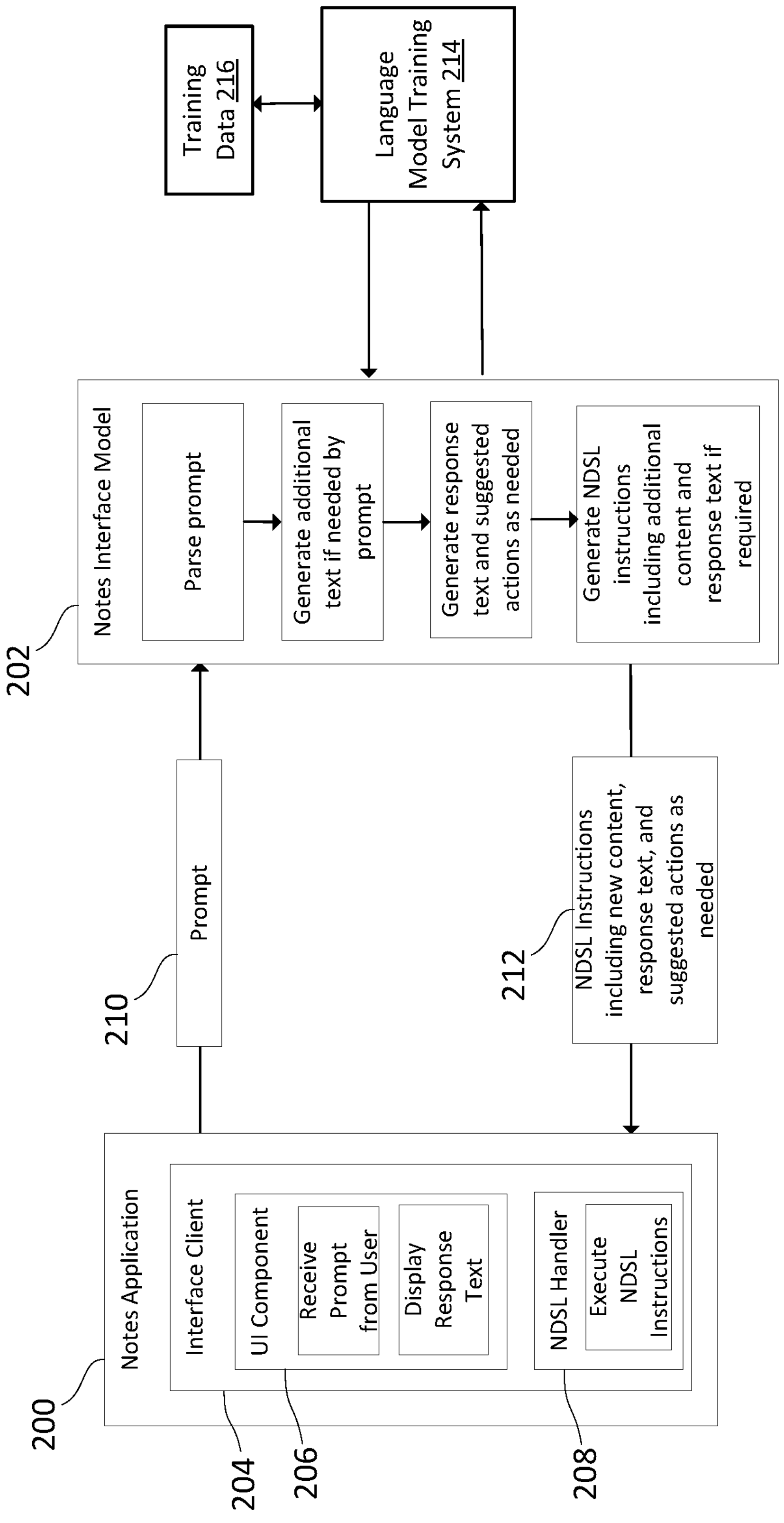
FIG. 2 depicts an example implementation of an AI-based interface system which may be implemented in the system of FIG. 1.

FIG. 2 shows a notes application 200 and notes interface model 202 and how these components interact in greater detail. Notes application 200 includes an interface client 204 that implements a UI component 206 and a NDSL handler 208 for the notes application 200. UI component 206 receives prompts input from a user which defines tasks to be performed in the notes application 200 and displays response text and suggested actions for the user. Interface client 204 communicates prompts 210 to notes interface model(s) 202 via a network (not shown). NDSL 208 handler receives NDSL instructions 212 from notes interface model 202 and executes the instructions to perform tasks in the notes application 200. In embodiments, the interface client 204 is integrated into the notes application 200, e.g., as an included feature or an added plug-in. In other embodiments, the interface client 204 is a standalone program that is programmed to communicate with the notes application 200.

Notes interface model 202 is trained to process the natural language of the prompt 210 to identify tasks to be performed and to generate NDSL instructions 212 that, when executed, causes the tasks to be performed in the notes application 200. In embodiments, NDSL instructions 212 are written in a NDSL that has been defined as part of a NDSL framework provided for the notes application. NDSL framework defines the terminology, functions, variables, syntax, protocols, etc. that enable interactions with the notes application 200 from outside of the application. In embodiments, the notes interface model 202 includes at least one language model trained recognize, summarize, translate, predict and/or generate text and other content. In implementations, the language model is an LLM. Examples of LLMs include, but are not limited to, generative models, such as Generative Pre-trained Transformer (GPT)-based models. e.g., GPT-3, GPT-4. ChatGPT, and the like. In other embodiments, any suitable type and number of language learning/processing model may be utilized.

In addition to identifying tasks to be performed, the notes interface model 202 is trained to process the prompt to determine whether generation of new content is required. When new content is required, the notes interface model is trained to generate the new content, such as by searching for and retrieving content from the internet, writing a passage pertaining to a topic, and finding synonyms, equivalent phrases, and the like. The notes interface model 202 is also trained to generate responsive text for responding to the prompt in conversational manner. In embodiments, the notes interface model 202 also processes the prompt to determine one or more suggested actions to present to a user. New content, responsive text, and suggested actions are generated as needed and included in or with the NDSL instructions 212. The training system 214 trains the model(s) 202 to receive prompts, identify tasks to be performed, generate new content if required, and generate application specific program code. In embodiments, a training system 24 is used to train the notes interface model 202. The training system 214 uses training data 216 to provide initial and ongoing training for notes interface model 202 to maintain and/or adjust performance. In embodiments, user feedback and telemetry data is collected to monitor the performance of the notes interface model 202 so that adjustments can be made to model training if needed.

The NDSL instructions (as well as responsive text and suggested actions when generated) are communicated to the interface client 204 where NDSL instructions are provided to the NDSL handler 208. The NDSL handler causes the NDSL instructions to be executed on the client device to perform the tasks in the notes application indicated by the prompt 210. Responsive text and suggested actions, when provided, are displayed in the UI component 206 of the interface client 204.

An example implementation of a UI component 300 of an interface client for a notes application 302 will now be described in connection with FIGS. 3A-3E. In embodiments, the UI component 300 is implemented as a pop-up window or dialogue which is activated from within the notes application 302 or within other applications on client device. For example, notes application 302 can include one or more UI controls (not shown) that enable the UI component 300 to be activated and displayed on a client device. In embodiments. UI controls for activating the UI component of the writing assistance client include buttons and/or user selectable options within one or more menus of the content editing application. In some embodiments, the UI component 300 is activated in response to receiving a predetermined keystroke or combination of keystrokes. As one example, the UI component 300 may be activated by typing the "@" character while input focus is on the notes application 302.

Figure 3A:
FIGS. 3A-3E show an implementation of a UI component of an interface client for the interface system of FIG. 2 during different stages of usage for an ongoing example.

The UI component 300 includes a text input field 304 for receiving the prompt from a user via a user input device, such as a keyboard, touch input, voice input, etc. The prompt is input in a natural language format. As seen in FIG. 3A, one example of a prompt which can be input by a user is "Create a new notebook for recipes". Once the UI component 300 is activated, all text entered into the input field 304 may be collected until a sequence termination command is received. The sequence termination command is generated in response to activation of a UI control, such as a button, or in response to receiving a predetermined keystroke or combination of keystrokes, such as hitting a TAB or Enter key on a keyboard. The interface client monitors user input in the UI component 300 for the sequence termination command. Once the sequence termination command is received, the interface client communicates the prompt to the AI interface service where it is provided to at least one notes interface model.

The notes interface model processes the prompt to identify tasks to be performed and to generate NDSL instructions, responsive text, and suggested actions as needed. In the case of FIG. 3A, the notes interface model generates a NDSL instruction for causing a new notebook to be created that is named "Recipes." The UI component 300 includes a responsive text region 306 where responsive text from the notes interface model is displayed and a suggested actions region 308 where suggested actions are displayed. In the example of FIG. 3A, the notes interface model generates responsive text confirming that a notebook 310 named "Recipes" has been created which is displayed in the responsive text region 306. The notes interface model also generated a suggested action, "Find recipes," which is include in the suggested action region 308 of the UI component 300. In embodiment, suggested actions listed in the suggested action region 308 can be actuated by clicking on the suggested action in the UI component or by typing the suggested in the text input field 304.

Figure 3B:
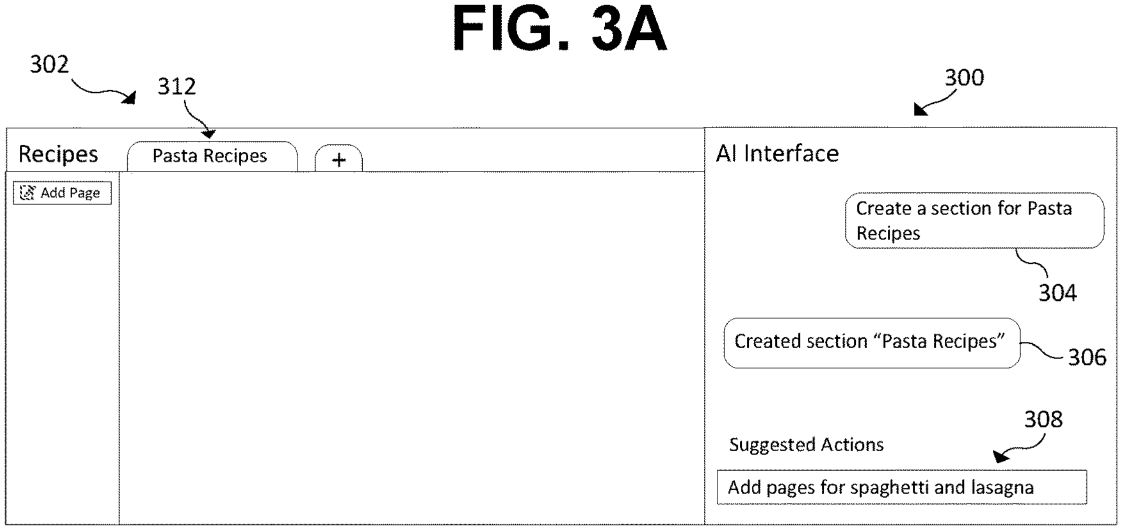

FIG. 3B shows an example of using the UI component 300 to generate a new section in a notebook. As seen in FIG. 3B, a prompt entered into the text input field 304 reads "Create a section for Pasta Recipes." The prompt is processed by a notes interface model to identify tasks to be performed, which in this case includes creating a section named "Pasta Recipes" in the Recipe notebook. The notes interface model also generates responsive text which is displayed in responsive text region 306 confirming that a section 312 named "Pasta Recipes" was created. Notes interface model also generated a suggested action which, in this case, includes adding pages for spaghetti and lasagna which is displayed in the suggested action region 308.

Figure 3C:

Continuing the example of FIGS. 3A and 3B, FIG. 3C shows an example of using the AI interface to create a page in a section. In this case, the prompt entered into the text input field 302 reads "Add pages for spaghetti and lasagna." The prompt is processed by the notes interface model to identify tasks to be performed, which in this case includes adding a page named "Spaghetti" and a page named "Lasagna" to the Pasta Recipes section in the Recipe notebook. The notes interface model also generates responsive text which is displayed in responsive text region 306 confirming that a page 314 named "Spaghetti" and a page 316 named "Lasagna" has been added. Notes interface model also generated a suggested action which, in this case, includes finding a lasagna recipe which is displayed in the suggested action region 308.

Figure 3D:
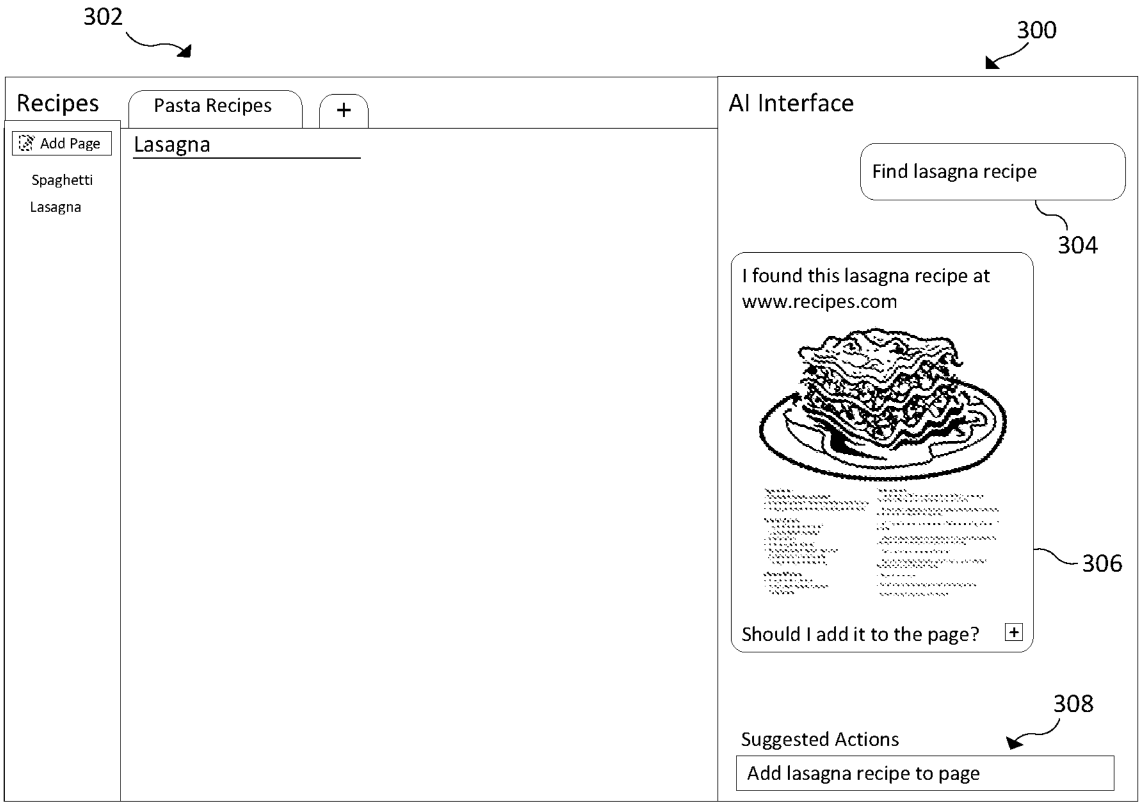

In addition to performing common tasks, such as creating notebooks, add sections, and adding pages, as shown in FIGS. 3A-3C. AI notes interface also enables new content to be generated and added to the notes application. Such an example is shown in FIG. 3D. In FIG. 3D, the prompt entered into the text input field 304 reads "Find lasagna recipe." The prompt is processed by the notes interface model to identify tasks to be performed which in this case includes finding and retrieving a lasagna recipe from the internet. The notes interface model finds and retrieves a lasagna recipe which, in this example, is provided to the interface client to be displayed in the responsive text region 306 for approval before being incorporated into the page. In this case, the responsive text includes the text "I found this recipe at www.recipes.com" before the retrieved recipe and "Should I add it to the page?" which is placed after the recipe. The suggested action provided by the notes interface model in this instance is "Add lasagna recipe to page" which is displayed in the suggested actions region 308.

Figure 3E:
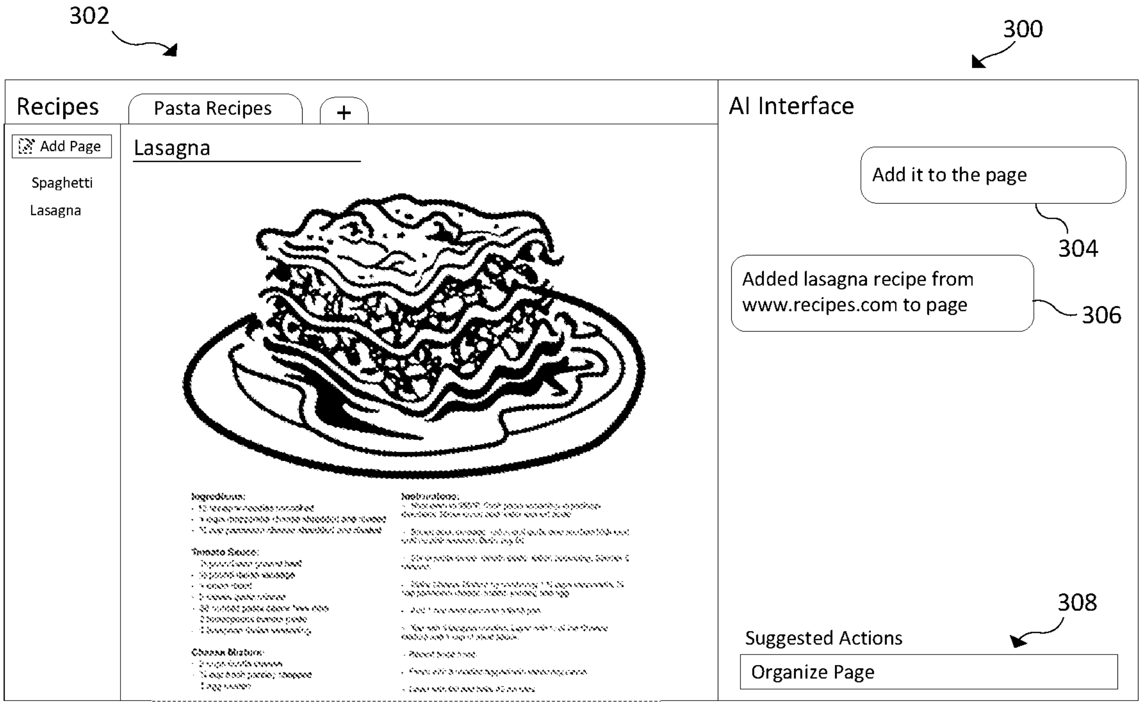

FIG. 3E shows how the AI notes interface can be used to incorporate new content into a page. In FIG. 3E, the prompt reads "Add it to the page." The notes interface model is queried to process the prompt to determine what task is to be performed as well as what ambiguous terms, such as "it", refer to in regard to the task. Since a recipe was shown in the UI component for approval by the user, the notes interface model would interpret "it" as referring to the retrieved recipe and generates NDSL instructions for adding the recipe to the page, as shown in FIG. 3E. In this case, the responsive text generated by the notes interface model reads "Added lasagna recipe from www.recipes.com to page." The notes interface model also generated a suggested action which in this case is "Organize page" which is displayed in the suggested action region 308.

Figure 4:
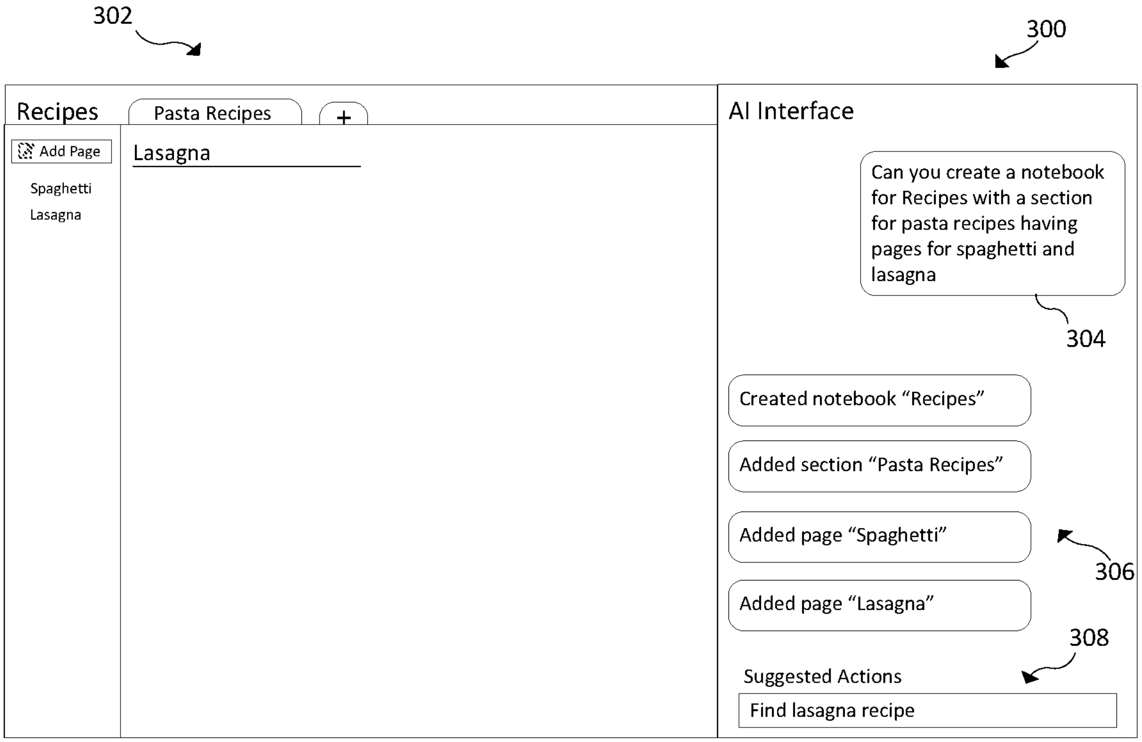
FIG. 4 shows another example implementation of a UI component of an interface client interacting with an AI interface component to perform a task, in this case a combination of the tasks performed for the examples shown in FIGS. 3A-3E.

FIG. 4 shows how multiple tasks can be included in a prompt and translated to NDSL instructions for the notes application. In FIG. 4, a single prompt is used to perform the tasks shown in FIGS. 3A-3C which reads "Can you create a notebook for Recipes with a section for pasta recipes having pages for spaghetti and lasagna?" The notes interface model processes the prompt to identify the tasks of creating a notebook, adding a section to the notebook, and adding two pages to the section, and generates the NDSL instructions for performing these tasks which are provided to the interface component for execution in the notes application. Responsive text 306 confirming the actions is shown in the UI component 300. A suggested action 308, "Find lasagna recipe", is also shown in UI component 300.

Figure 5:
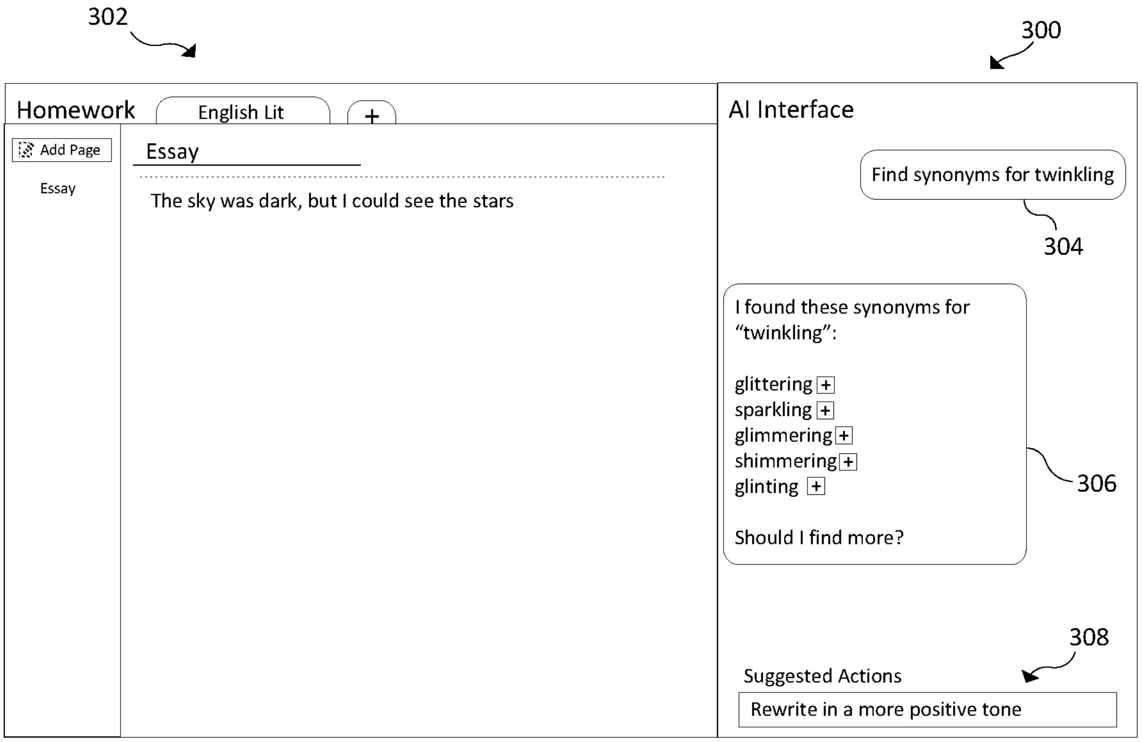
FIG. 5 shows another example implementation of a UI component of an interface client interacting with an AI interface component to perform a task, in this case finding synonyms for a word.

FIG. 5 shows an example of using the AI notes interface to provide writing assistance in the notes application which, in this case, is finding synonyms for a word. The prompt in FIG. 5 reads "Find synonyms for twinkling." The notes interface model processes the prompt and determines that a list of synonyms for twinkling needs to be generated and presented to the user. The notes interface model generates the list and returns the list with responsive text to the interface client where the list is displayed in the responsive text region 306. The UI component 300 enables text from the responsive text region 306 to be added to the page, in this case, where the cursor is located. A user can select one of the synonyms to incorporate into the page, e.g., by clicking on the word itself or by clicking on an Add button proximate the word. In this case, the notes interface model provided a suggested action "Rewrite in a more positive tone" which is displayed in the suggested actions region 308.

Figure 6:
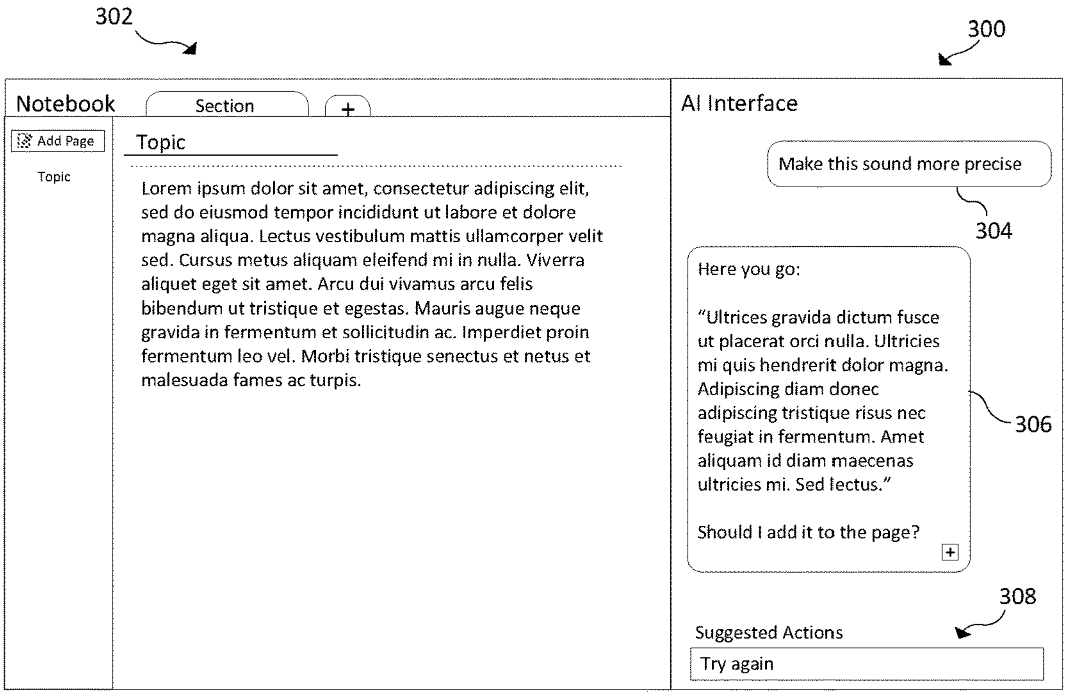
FIG. 6 shows another example implementation of a UI component of an interface client interacting with an AI interface component to perform a task, in this case performing a rewrite to sound more precise.

FIG. 6 shows an example of using AI notes interface to rewrite textual content of a page in a more precise manner. In FIG. 6, the prompt reads "Make this sound more precise." The notes interface model processes the prompt to identify the task to be performed which is rewriting text with a more positive tone. The model also determines that the ambiguous term "this" refers to the text of the current page. The notes interface model processes the text by rewriting the text with a more positive tone. In this case, the rewritten text is presented in the responsive text region 306 for approval before adding it to the page. The notes application model also provided a suggested action "Try again" which is displayed in the suggested action region 308.

Figure 7:
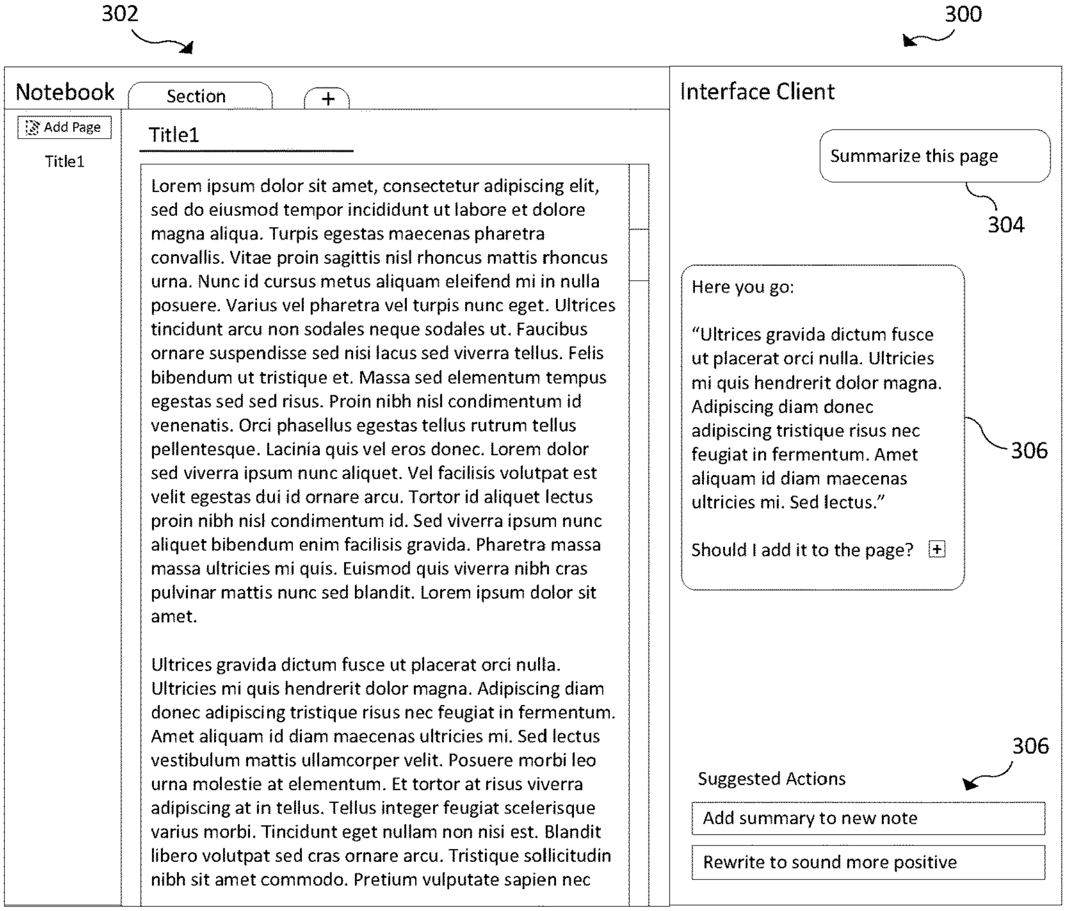
FIG. 7 shows another example implementation of a UI component of an interface client interacting with an AI interface component to perform a task, in this case summarizing a page.

FIG. 7 shows an example of using the AI notes interface to summarize the content of a page. In FIG. 7, the prompt reads "Summarize this page." The notes interface model processes the prompt and identifies the task and performs the task of summarizing the text of the page. In this case, the summary is displayed in the responsive text region 306 for approval. The notes application model also provided suggested actions that read "Add summary to new note" and "Rewrite to sound more positive" which are displayed in the suggested action region 308.

Figure 8:
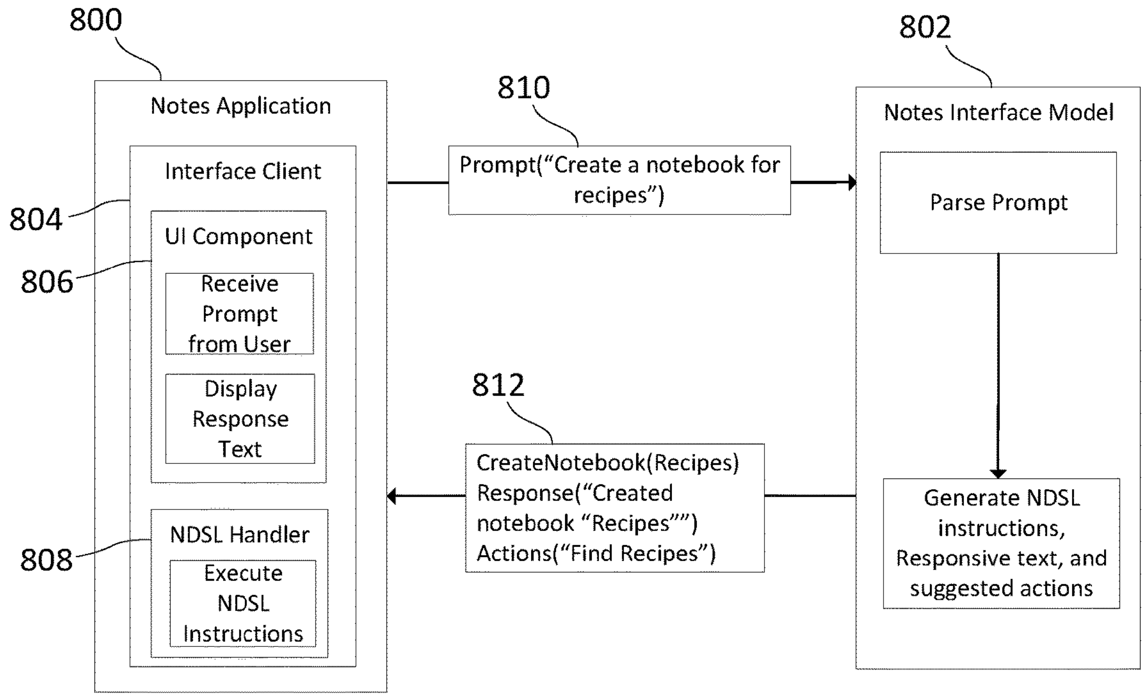
FIG. 8 is a diagram showing a notes application and notes interface model that shows communications and process flow between the components to implement the example of FIG. 3A.

FIGS. 8-13 show examples of the interactions and flow of information between a notes application 800 and notes interface model 802 to perform tasks, such as the tasks shown in FIGS. 3A-3E and 4-7. In particular, FIG. 8 depicts the components, communications, and process flows used to implement the example shown of FIG. 3A. Notes application 800 includes an interface client 804 that has a UI component 806 and a NDSL handler 808. UI component 806 receives a prompt which reads "Create a notebook for recipes." Prompt 810 is communicated to the notes interface model 802 (e.g., via a network). Notes interface model 802 processes the prompt to identify the tasks, which in this case is creating a new notebook named recipes. The notes interface model 802 generates the NDSL instructions for performing the task and causing the responsive text ("Created notebook recipes") and suggested actions to be displayed in the UI component 806. The NDSL instructions 812 are communicated to the interface client 804 where they are provided to the NDSL handler which executes the NDSL instructions.

Figure 9:
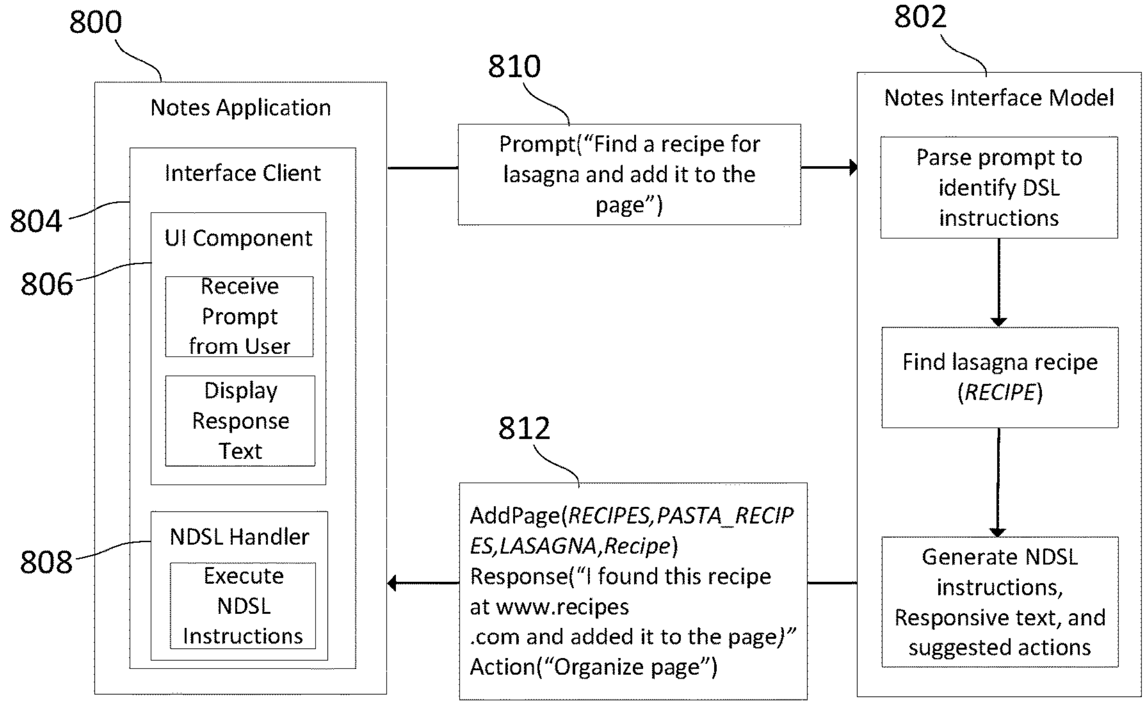
FIG. 9 is a diagram showing a notes application and notes interface model that shows communications and process flow between the components to implement an example, which is a combination of the examples shown in FIGS. 3D and 3E.

FIG. 9 depicts the components, communications, and process flow used to implement the example shown in FIGS. 3D and 3E which are combined in this example. In this case, the prompt reads "Find a recipe for lasagna and add it to the page." UI component 806 receives a prompt which reads "Find a recipe for lasagna and add it to the page." Prompt 810 is communicated to the notes interface model 802. Notes interface model 802 processes the prompt to identify the tasks, which in this case include finding and retrieving a lasagna recipe and adding the recipe to the current page. The notes interface model 802 generates the NDSL instructions for performing the task and displaying responsive text ("I found this recipe at www.recipes.com and added it to the page") and suggested actions ("Organize page") in the UI component 806. The NDSL instructions 812 are communicated to the interface client 804 and provided to the NDSL handler 808 for execution in the notes application 800.

Figure 10:
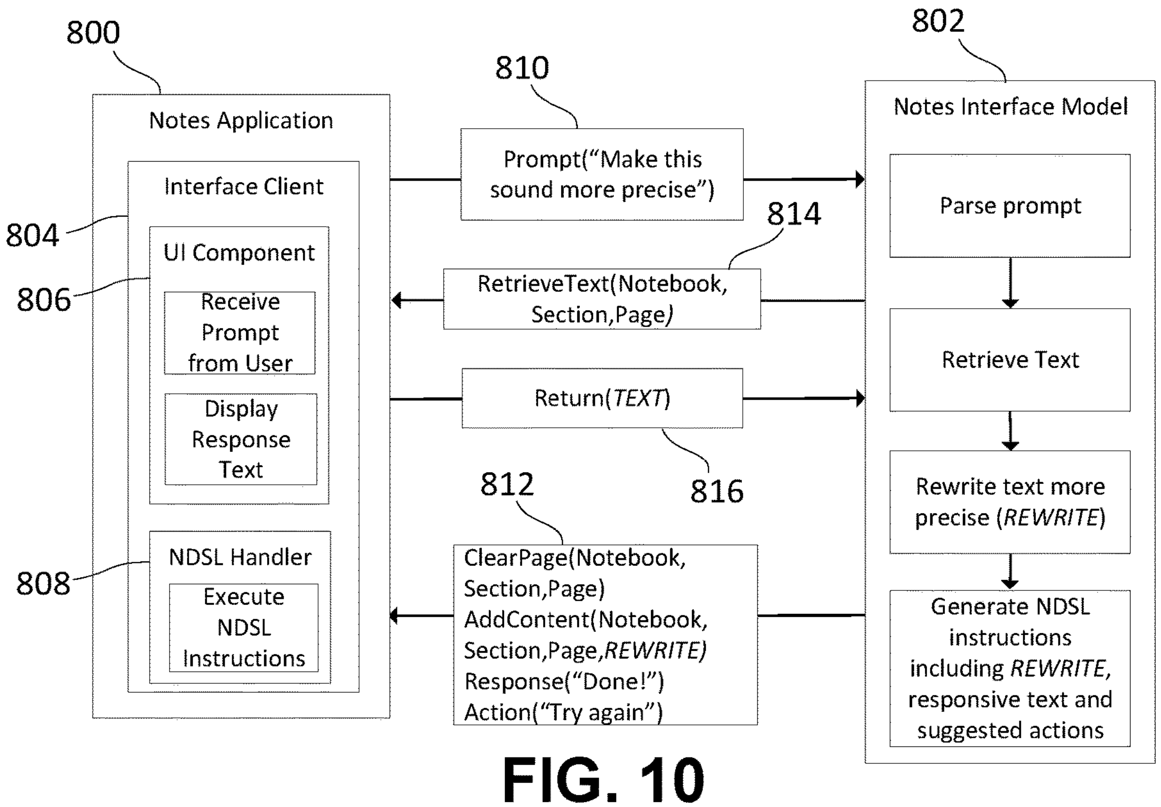
FIG. 10 is a diagram showing a notes application and notes interface model that shows communications and process flow between the components to implement the example of FIG. 6.

FIG. 10 depicts the components, communications, and process flow used to implement the example shown in FIG. 6. In this example, the prompt 810 communicated to the notes interface model 802 reads "Make this sound more precise." The notes interface model 802 processes the prompt and determines the tasks which need to be performed which include retrieving the text of the page so it can be rewritten in a more positive tone. The notes interface model 802 generates NDSL instructions 814 for retrieving the text of the page. NDSL instruction 814 is processed by the NDSL handler 808 which results in the text 816 of the page being returned to the notes interface model 802. The notes interface model 802 then processes the text by rewriting the text in a more positive tone. The notes interface model also generates the responsive text and suggested actions. The notes interface model then generates NDSL instructions 812 including the rewritten text (e.g., REWRITE), responsive text, and suggested actions which is output to the NDSL handler 808 of the interface client 804.

Figure 11:
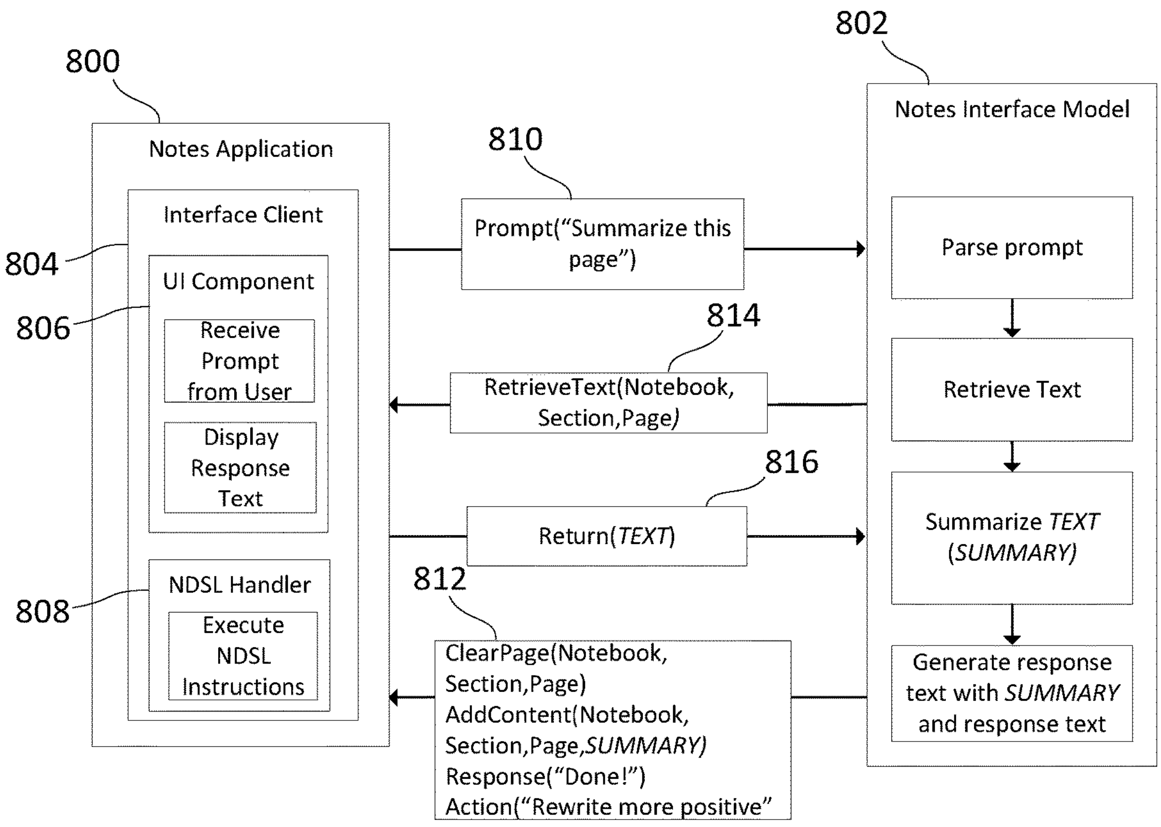
FIG. 11 is a diagram showing a notes application and notes interface model that shows communications and process flow between the components to implement an example similar to the example of FIG. 7.

FIG. 11 depicts the components, communications, and process flow used to implement the example shown in FIG. 7. In this example, the prompt 810 communicated to the notes interface model 802 reads "Summarize this page." The notes interface model 802 processes the prompt and determines the tasks which need to be performed which include retrieving the text of the page so it can be summarized. The notes interface model 802 generates NDSL instructions 814 for retrieving the text of the page. NDSL instruction 814 is processed by the NDSL handler 808 which results in the text 816 of the page being returned to the notes interface model 802. The notes interface model 802 then processes the text by summarizing the text. The notes interface model also generates the responsive text and suggested actions. The notes interface model then generates NDSL instructions 812 including the summarized text (e.g., SUMMARY), responsive text, and suggested actions which is output to the NDSL handler 808 of the interface client 804.

Figure 12:
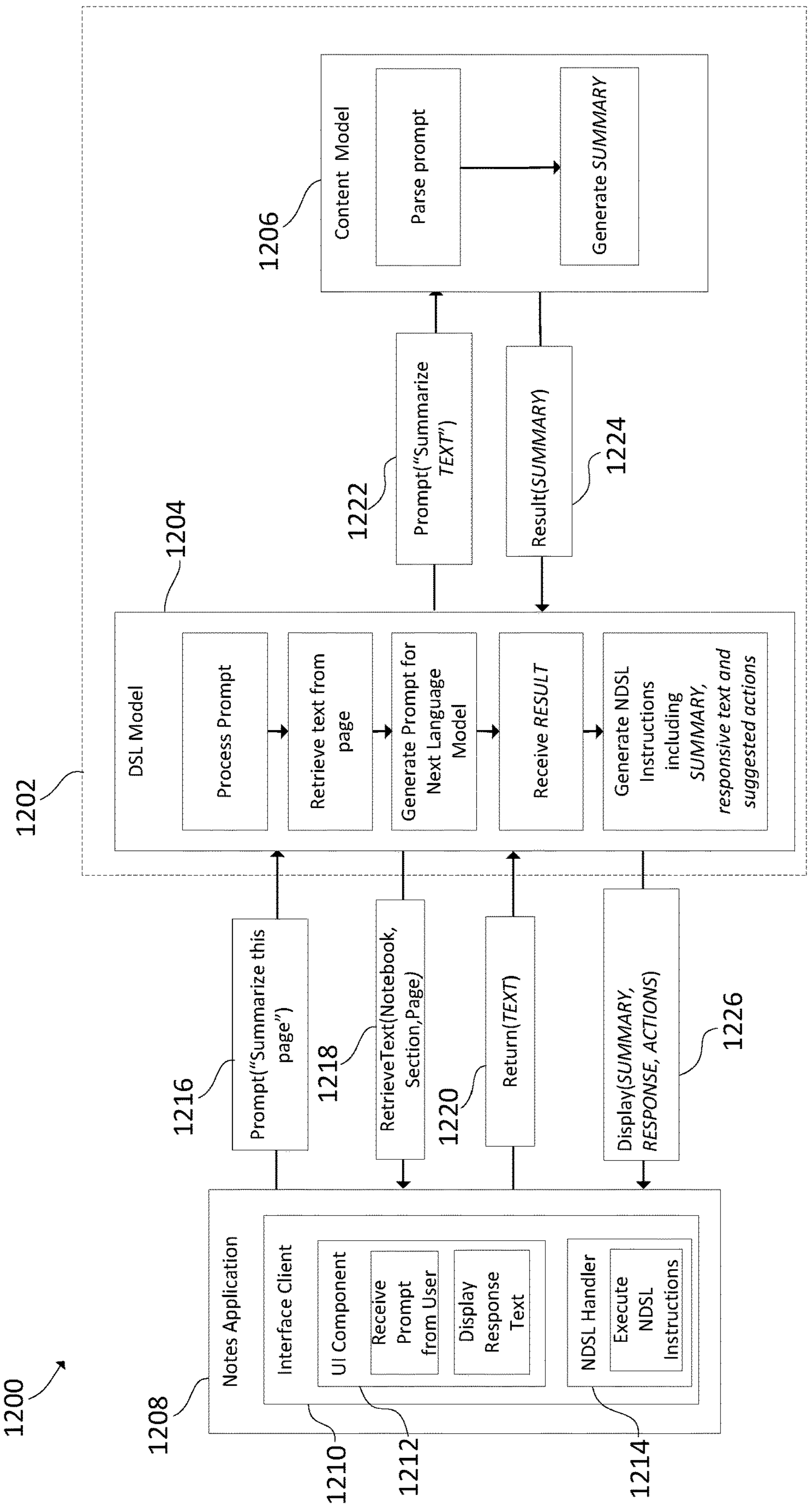
FIG. 12 is a diagram showing an embodiment of an AI notes interface having two language models for implementing an AI notes interface for a notes application.

The examples so far have utilized a single model for processing prompts, generating new content, generating response text, and determining suggested actions. In other embodiments, two or more language models may be used to implement the AI notes interface. Using separate models for different tasks enables each model to specialize in a particular task which may improve results and processing times at the expense of increased resource utilization. In embodiments, a separate model may be used to perform each task. In other embodiments, tasks may be divided between models such that models may have more than one task to perform (but not all the tasks). FIG. 12 shows an example 1200 in which the AI notes interface 1202 has two models: a NDSL model 1204 trained to process prompts and generate NDSL instructions for causing tasks to be performed in a notes application, and a content model 1206 trained to generate content for the notes application.

In the example 1200 of FIG. 12, the AI notes interface 1202 is for a notes application 1208 having an interface client 1210 that includes a UI component 1212 for receiving prompts and displaying response text and a NDSL handler 1214 for executing NDSL instructions received from the AI notes interface 1202. A prompt 1216 received via the UI component 1212 is provided as an input to the NDSL model 1204. The NDSL model 1204 is queried to process the prompt to determine the task(s) to be performed and to determine whether a task requires new text to be generated. In this example, the prompt reads "Summarize this page." The NDSL model 1204 determines that the text content of the page must be retrieved and generates NDSL instructions 1218 for retrieving the text from the notes application 1208. The NDSL instructions 1218 are processed by the NDSL handler 1214 which returns the text 1220 of the current page to the NDSL model 1204.

The NDSL model 1204 also determines that the prompt 1216 requires new text content to be generated, i.e., a summary of the text 1220 from the page, and generates a content prompt 1222 that is provided as input to the content model 1206 (e.g., "Summarize TEXT"). The content model 1206 is queried to process the prompt and to generate the new content required by the prompt, in this case a summary of the text. The content model 1206 outputs the summary as a result 1224 which is returned to the NDSL model 1204 as an input. The NDSL model 1204 receives the summary and generates NDSL instructions 1226 including the summary, responsive text, and suggested actions that is output to the notes application 1208. The NDSL handler 1214 executes the NDSL instructions 1226 which results in a summary of the text of the page being displayed in the UI component 1212 along with responsive text and suggested actions, such as is shown in FIG. 7.

Figure 13:
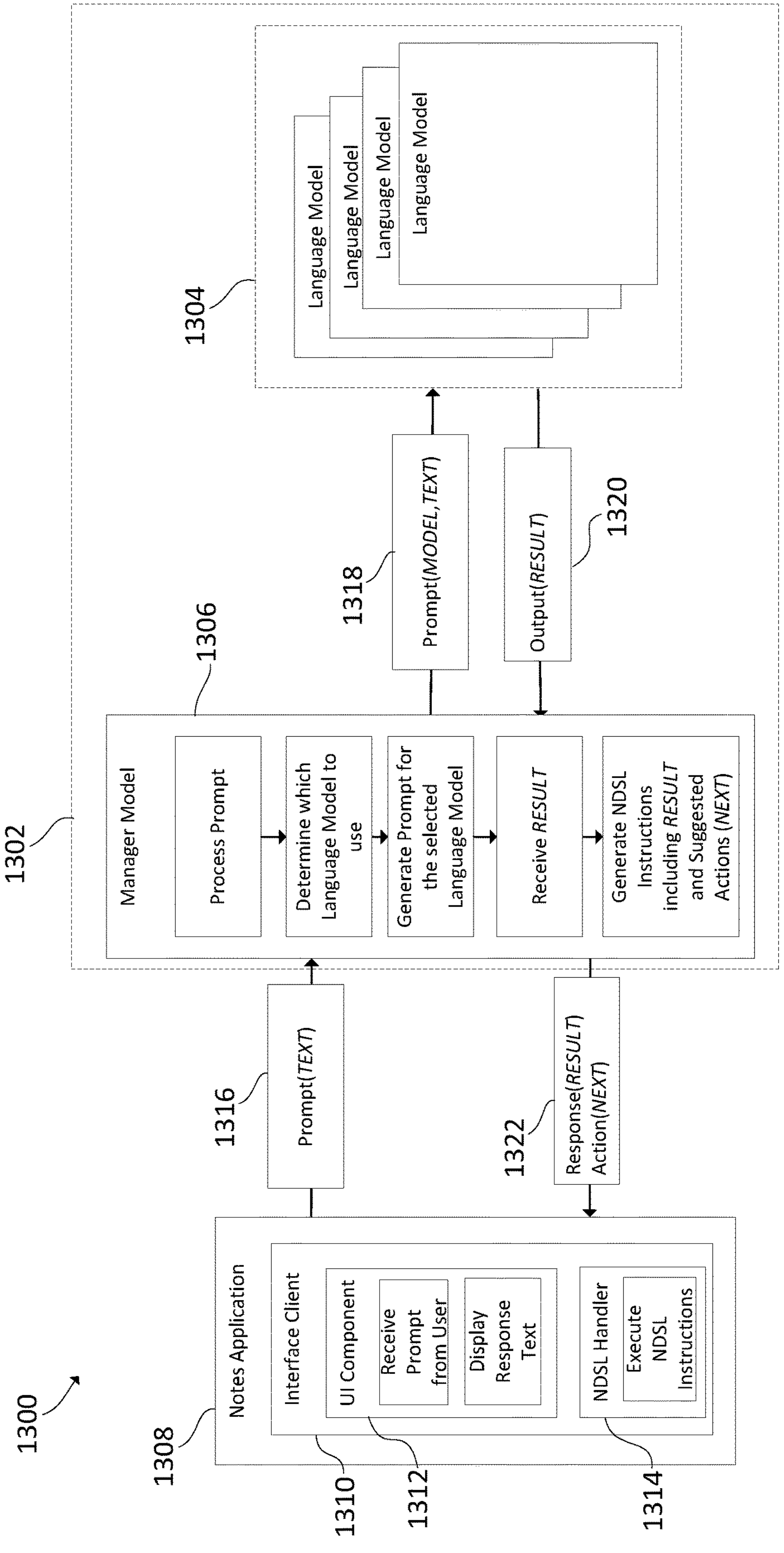
FIG. 13 is a diagram showing another embodiment of an AI notes interface having a plurality of language models for implementing an AI notes interface for a notes application.

As noted above, any suitable number of language models may be used to implement an AI notes interface for a notes application. FIG. 13 shows an example in which an AI notes interface 1302 that includes a plurality of language models 1304 which are trained to perform different tasks. The plurality of language models 1304 may also include language models which have been trained to perform the same task and to provide different outputs. In this example 1300, the AI notes interface 1302 is for a notes application 1308 having an interface client 1310 that includes a UI component 1312 for receiving prompts and displaying response text and suggested actions and a NDSL handler 1314 for executing NDSL instructions received from the AI notes interface 1302. A prompt 1316 received via the UI component 1312 is provided as an input to the AI notes interface 1302.

In this example 1300, the AI notes interface includes a manager model 1306 which is similar to the NDSL model 1204 of FIG. 12 in that it receives prompts and processes prompts to identify tasks that need to be performed and to generate NDSL instructions for causing the tasks to be performed in the notes application 1308. The manager model 1306 is also trained to process prompts to determine which of the language models 1304 to use to perform tasks for the prompt and to generate prompt 1318 which are output to the model or models selected by the manager model. For example, one language model may be used to summarize content, another may be used to generate suggested actions, another model may be used to generate responsive text, and so on. The manager model 1306 generates prompts 1318 for each model 1304 that is needed to help process the prompt 1316. The selected model(s) 1304 processes the prompt 1318 and generates a result 1320 which is output the manager model 1306. The manager model receives the result and generates NDSL instructions 1322 including the result, responsive text, and suggested actions which is output to the notes application 1308. The NDSL handler 1314 receives the NDSL instructions 1322 and executes the instructions to perform the tasks in the note application for the prompt 1316.

Figure 14:
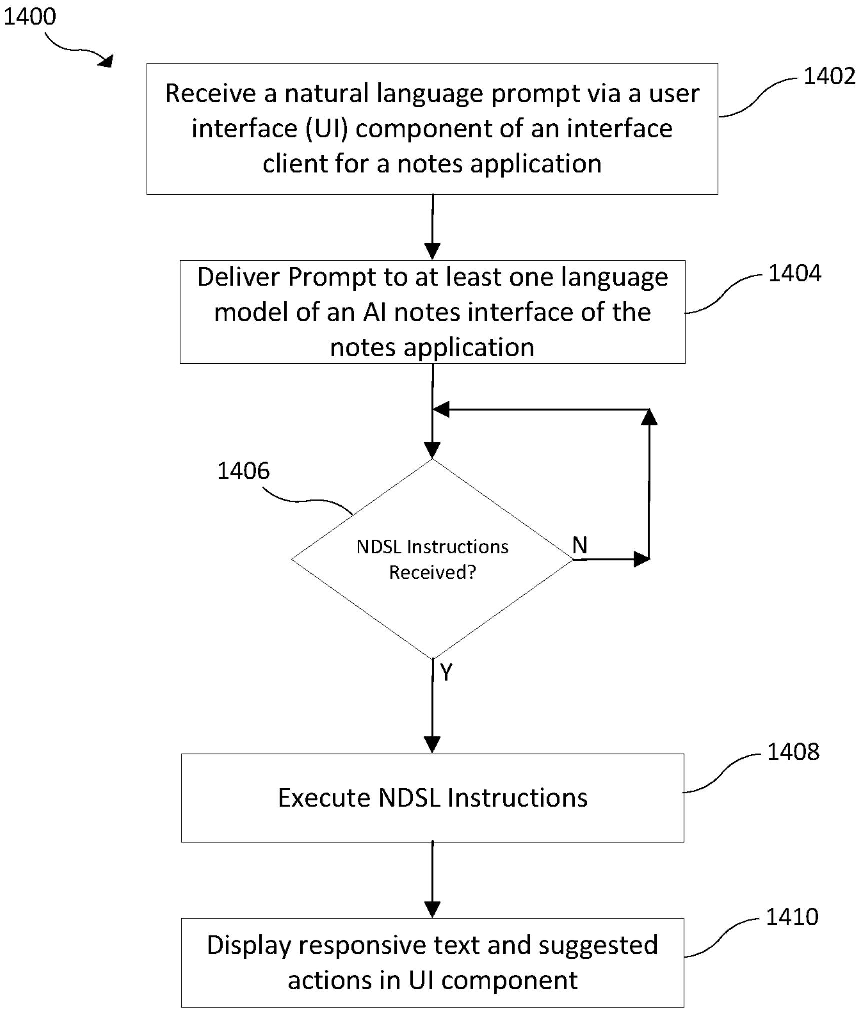
FIG. 14 depicts a flow diagram of an example method for interacting with an AI notes interface of a notes application.

FIG. 14 shows an example flowchart 1400 of a method of interacting with an AI notes interface which may be implemented by an interface client of a notes application. The method begins with receiving a prompt via a UI component of the interface client (block 1402). The prompt is delivered to at least one language model of an AI notes interface for the notes application (block 1404). The at least one language model is queried to process the prompt to identify tasks to be performed in the notes application and to generate new content, responsive text, and suggested actions as needed for the prompt. The at least one language model outputs NDSL instructions including any new content, responsive text, and suggested actions that has been generated for the prompt. The interface client waits until NDSL instructions are received from the AI notes interface (block 1406). Once the NDSL instructions are received, the NDSL instructions are provided to a NDSL handler of the interface component and executed (block 1408) in the notes application to perform the task(s) indicated by the prompt. As part of the instructions, responsive text and suggested actions are displayed in the UI component (block 1410).

Figure 15:
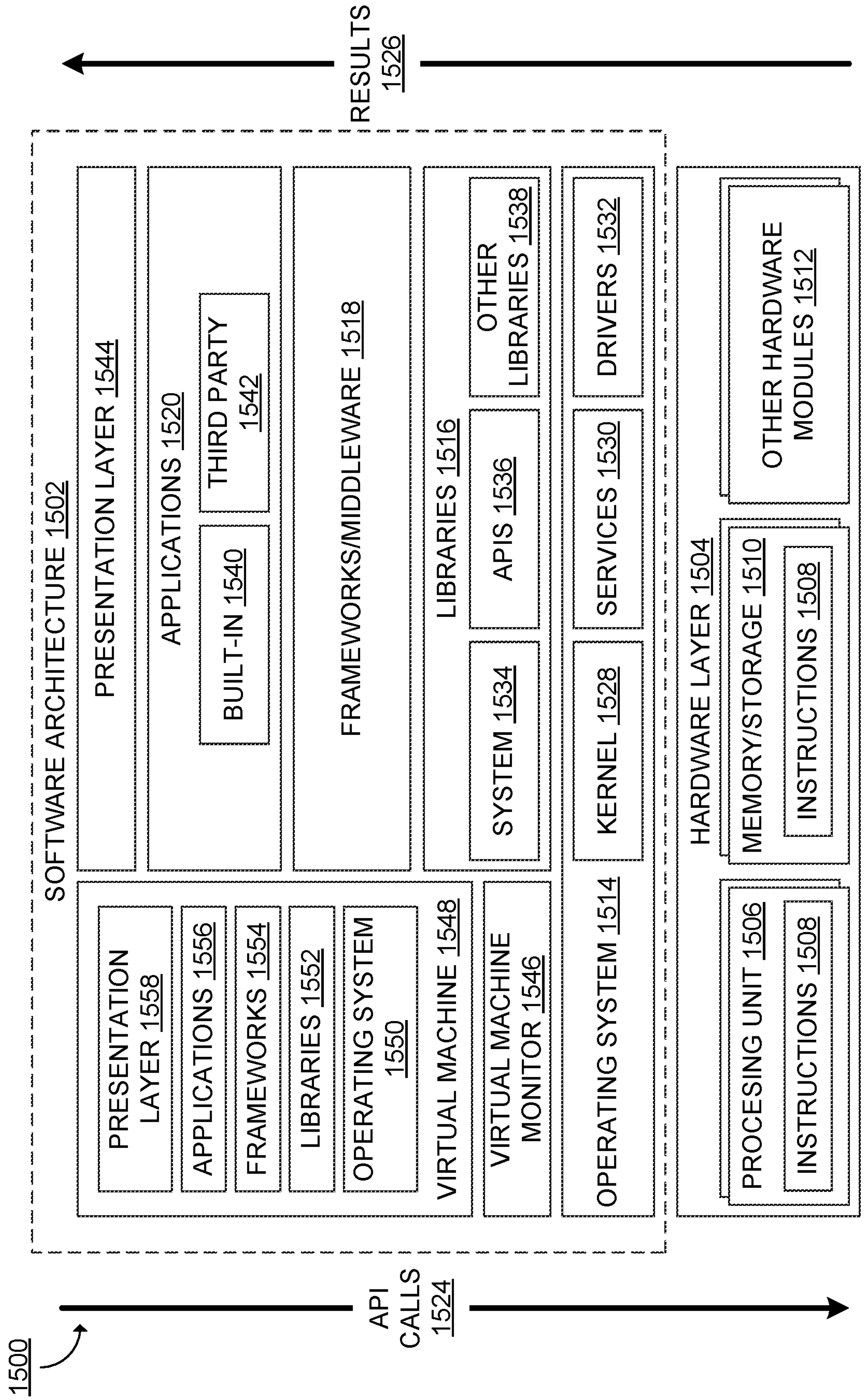
FIG. 15 is a block diagram of an example computing device, which may be used to provide implementations of the mechanisms described herein.

FIG. 15 is a block diagram 1500 illustrating an example software architecture 1502, various portions of which may be used in conjunction with various hardware architectures herein described, which may implement any of the above-described features. FIG. 15 is a non-limiting example of a software architecture and it will be appreciated that many other architectures may be implemented to facilitate the functionality described herein. The software architecture 1502 may execute on hardware that includes, among other things, document storage, processors, memory, and input/output (I/O) components. A representative hardware layer 1504 is illustrated and includes a processing unit 1506 and associated executable instructions 1508. The executable instructions 1508 represent executable instructions of the software architecture 1502, including implementation of the methods, modules and so forth described herein. The hardware layer 1504 also includes a memory/storage 1510, which also includes the executable instructions 1508 and accompanying data. The hardware layer 1504 may also include other hardware modules 1512. Instructions 1508 held by processing unit may be portions of instructions 1508 held by the memory/storage 1510.

The example software architecture 1502 may be conceptualized as layers, each providing various functionality. For example, the software architecture 1502 may include layers and components such as an operating system (OS) 1514, libraries 1516, frameworks 1518, applications 1520, and a presentation layer 1544. Operationally, the applications 1520 and/or other components within the layers may invoke API calls 1524 to other layers and receive corresponding results 1526. The layers illustrated are representative in nature and other software architectures may include additional or different layers. For example, some mobile or special purpose operating systems may not provide the frameworks/middleware 1518.

The OS 1514 may manage hardware resources and provide common services. The OS 1514 may include, for example, a kernel 1528, services 1530, and drivers 1532. The kernel 1528 may act as an abstraction layer between the hardware layer 1504 and other software layers. For example, the kernel 1528 may be responsible for memory management, processor management (for example, scheduling), component management, networking, security settings, and so on. The services 1530 may provide other common services for the other software layers. The drivers 1532 may be responsible for controlling or interfacing with the underlying hardware layer 1504. For instance, the drivers 1532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1516 may provide a common infrastructure that may be used by the applications 1520 and/or other components and/or layers. The libraries 1516 typically provide functionality for use by other software modules to perform tasks, rather than rather than interacting directly with the OS 1514. The libraries 1516 may include system libraries 1534 (for example, C standard library) that may provide functions such as memory allocation, string manipulation, file operations. In addition, the libraries 1516 may include API libraries 1536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1516 may also include a wide variety of other libraries 1538 to provide many functions for applications 1520 and other software modules.

The frameworks 1518 (also sometimes referred to as middleware) provide a higher-level common infrastructure that may be used by the applications 1520 and/or other software modules. For example, the frameworks 1518 may provide various graphic user interface (GUI) functions, high-level resource management, or high-level location services. The frameworks 1518 may provide a broad spectrum of other APIs for applications 1520 and/or other software modules.

The applications 1520 include built-in applications 1540 and/or third-party applications 1542. Examples of built-in applications 1540 may include, but are not limited to, a contacts application, a browser application, a location application, a media application, a messaging application, and/or a game application. Third-party applications 1542 may include any applications developed by an entity other than the vendor of the particular platform. The applications 1520 may use functions available via OS 1514, libraries 1516, frameworks 1518, and presentation layer 1544 to create user interfaces to interact with users.

Some software architectures use virtual machines, as illustrated by a virtual machine 1548. The virtual machine 1548 provides an execution environment where applications/modules can execute as if they were executing on a hardware machine (such as the machine 800 of FIG. 10, for example). The virtual machine 1548 may be hosted by a host OS (for example, OS 1514) or hypervisor, and may have a virtual machine monitor 1546 which manages operation of the virtual machine 1548 and interoperation with the host operating system. A software architecture, which may be different from software architecture 1502 outside of the virtual machine, executes within the virtual machine 1548 such as an OS 1550, libraries 1552, frameworks 1554, applications 1556, and/or a presentation layer 1558.

Figure 16:
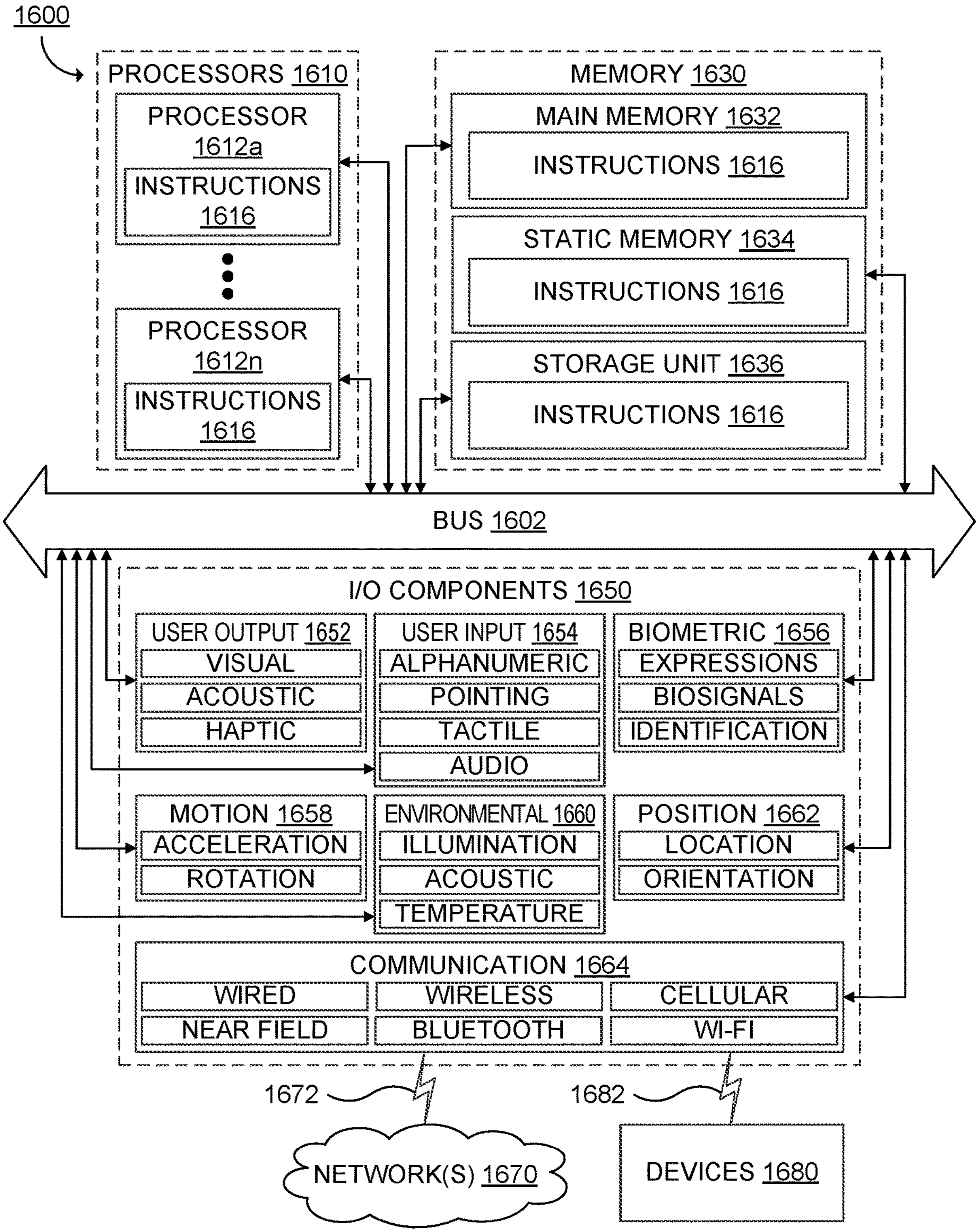
FIG. 16 is a block diagram illustrating components of an example machine configured to read instructions from a machine-readable medium.

FIG. 16 is a block diagram illustrating components of an example machine 1600 configured to read instructions from a machine-readable medium (for example, a machine-readable storage medium) and perform any of the features described herein. The example machine 1600 is in the form of a computer system, within which instructions 1616 (for example, in the form of software components) for causing the machine 1600 to perform any of the features described herein may be executed. As such, the instructions 1616 may be used to implement modules or components described herein. The instructions 1616 cause unprogrammed and/or unconfigured machine 1600 to operate as a particular machine configured to carry out the described features. The machine 1600 may be configured to operate as a standalone device or may be coupled (for example, networked) to other machines. In a networked deployment, the machine 1600 may operate in the capacity of a server machine or a client machine in a server-client network environment, or as a node in a peer-to-peer or distributed network environment. Machine 1600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1600 is illustrated, the term "machine" includes a collection of machines that individually or jointly execute the instructions 1616.

The machine 1600 may include processors 1610, memory 1630, and I/O components 1650, which may be communicatively coupled via, for example, a bus 1602. The bus 1602 may include multiple buses coupling various elements of machine 1600 via various bus technologies and protocols. In an example, the processors 1610 (including, for example, a central processing unit (CPU), a graphics processing unit (GPU), a digital signal processor (DSP), an ASIC, or a suitable combination thereof) may include one or more processors 1612*a* to 1612*n* that may execute the instructions 1616 and process data. In some examples, one or more processors 1610 may execute instructions provided or identified by one or more other processors 1610. The term "processor" includes a multi-core processor including cores that may execute instructions contemporaneously. Although FIG. 16 shows multiple processors, the machine 1600 may include a single processor with a single core, a single processor with multiple cores (for example, a multi-core processor), multiple processors each with a single core, multiple processors each with multiple cores, or any combination thereof. In some examples, the machine 1600 may include multiple processors distributed among multiple machines.

The memory/storage 1630 may include a main memory 1632, a static memory 1634, or other memory, and a storage unit 1636, both accessible to the processors 1610 such as via the bus 1602. The storage unit 1636 and memory 1632, 1634 store instructions 1616 embodying any one or more of the functions described herein. The memory/storage 1630 may also store temporary, intermediate, and/or long-term data for processors 1610. The instructions 1616 may also reside, completely or partially, within the memory 1632, 1634, within the storage unit 1636, within at least one of the processors 1610 (for example, within a command buffer or cache memory), within memory at least one of I/O components 1650, or any suitable combination thereof, during execution thereof. Accordingly, the memory 1632, 1634, the storage unit 1636, memory in processors 1610, and memory in I/O components 1650 are examples of machine-readable media.

As used herein, "machine-readable medium" refers to a device able to temporarily or permanently store instructions and data that cause machine 1600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1616) for execution by a machine 1600 such that the instructions, when executed by one or more processors 1610 of the machine 1600, cause the machine 1600 to perform and one or more of the features described herein. Accordingly, a "machine-readable medium" may refer to a single storage device, as well as "cloud-based" storage systems or storage networks that include multiple storage apparatus or devices.

The I/O components 1650 may include a wide variety of hardware components adapted to receive input, provide output, produce output, transmit information, exchange information, capture measurements, and so on. The specific I/O components 1650 included in a particular machine will depend on the type and/or function of the machine. For example, mobile devices such as mobile phones may include a touch input device, whereas a headless server or IoT device may not include such a touch input device. The particular examples of I/O components illustrated in FIG. 16 are in no way limiting, and other types of components may be included in machine 1600. The grouping of I/O components 1650 are merely for simplifying this discussion, and the grouping is in no way limiting. In various examples, the I/O components 1650 may include user output components 1652 and user input components 1654. User output components 1652 may include, for example, display components for displaying information (for example, a liquid crystal display (LCD) or a projector), acoustic components (for example, speakers), haptic components (for example, a vibratory motor or force-feedback device), and/or other signal generators. User input components 1654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1650 may include biometric components 1656 and/or position components 1662, among a wide array of other environmental sensor components. The biometric components 1656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1662 may include, for example, location sensors (for example, a Global Position System (GPS) receiver), altitude sensors (for example, an air pressure sensor from which altitude may be derived), and/or orientation sensors (for example, magnetometers).

The I/O components 1650 may include communication components 1664, implementing a wide variety of technologies operable to couple the machine 1600 to network(s) 1670 and/or device(s) 1680 via respective communicative couplings 1672 and 1682. The communication components 1664 may include one or more network interface components or other suitable devices to interface with the network(s) 1670. The communication components 1664 may include, for example, components adapted to provide wired communication, wireless communication, cellular communication, Near Field Communication (NFC), Bluetooth communication, Wi-Fi, and/or communication via other modalities. The device(s) 1680 may include other machines or various peripheral devices (for example, coupled via USB).

In some examples, the communication components 1664 may detect identifiers or include components adapted to detect identifiers. For example, the communication components 1664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1664, such as, but not limited to, geo-location via Internet Protocol (IP) address, location via Wi-Fi, cellular. NFC. Bluetooth, or other wireless station identification and/or signal triangulation.

In the following, further features, characteristics and advantages of the invention will be described by means of items:

Item 1. An artificial intelligence (AI)-based interface system for a notes application, the AI-based interface system comprising:
a processor, and
a memory in communication with the processor, the memory comprising executable instructions that, when executed by the processor alone or in combination with other processors, cause the system to perform functions of:
receiving a prompt via a user interface (UI) component of an interface client, the prompt defining at least one task to be performed in the notes application;
sending, over a communication network, the prompt to an AI notes interface including at least one language model, the prompt being provided to at least one language model as input, the at least one language model being trained to process the prompt to identify the at least one task to be performed and to generate notes domain-specific language (NDSL) instructions for execution in the notes application to perform the task, the at least one language model providing the NDSL instructions as an output, the NDSL instructions being based on a NDSL framework implemented for the notes application;
receiving, over the communication network, the output including the NDSL instructions from the at least one language model; and
executing the NDSL instructions using a NDSL handler in the notes application to perform the at least one task indicated by the prompt.

Item 2. The AI-based interface system of item 1, wherein the prompt is in a natural language format.

Item 3. The AI-based interface system of any of items 1-2, wherein the at least one task includes adding a new element to the notes application, the new element being at least one of a new note, a new notebook, a new section, and a new page.

Item 4. The AI-based interface system of any of items 1-3, wherein:
the at least one task includes adding new content to a note of the notes application,
the at least one language model is trained to generate the new content, and
wherein the output of the at least one language model includes a NDSL instruction for adding the new content to the note of the notes application.

Item 5. The AI-based interface system of any of items 1-4, wherein:
the new content includes a summary of content of the element.
the at least one language model is trained to generate the summary of the content of the note, and
the output of the at least one language model includes a NDSL instruction for adding the summary to the note.

Item 6. The AI-based interface system of any of items 1-5, wherein:
the new content includes a rewrite of content of the note with a predetermined tone,
the at least one language model is trained to generate the rewrite of the content of the note with the predetermined tone, and
the output of the at least one language model includes a NDSL instruction for adding the rewrite to the note.

Item 7. The AI-based interface system of any of items 1-6, wherein:
the new content is generated from existing content of the note,
the NDSL instructions include instructions for retrieving the existing content of the note, and
the memory further includes executable instructions that, when executed by the processor alone or in combination with other processors, cause the system to perform functions of:
receiving the NDSL instructions for retrieving the existing content of the page,
in response to receiving the NDSL instructions for retrieving the existing content of the page, sending the existing content to the at least one language application over the communication network; and
in response to receiving the existing content of the page, the at least one language model generates the new content from the existing content.

Item 8. The AI-based interface system of any of items 1-7, wherein:
the at least one task includes retrieving new content and adding the new content to a note in the notes application,
the at least one language model is trained to retrieve the new content from an external source, and
the output of the at least one language model includes a NDSL instruction for adding the new content to the note.

Item 9. The AI-based interface system of any of items 1-8, wherein:
the at least one task includes generating a list of synonyms for a word,
the at least one language model is trained to generate the list of synonyms for the word, and
the output of the at least one language model includes a NDSL instruction for displaying the list in the UI component.

Item 10. The AI-based interface system of any of items 1-9, wherein:
the at least one language model is trained to determine suggested actions to perform based at least in part on the task indicated by the prompt, and
the output includes at least one NDSL instruction for displaying the suggested actions in the UI component.

Item 11. The AI-based interface system of any of items 1-10, wherein:
the at least one language model includes at least a first language model and a second language model, and
the first language model is trained to process the prompt to identify the at least one task to be performed and to generate the NDSL instruction for causing the at least one task to be performed in the notes application, the first language model being further trained to process the at least one prompt to determine when new content is required as part of the at least one task and to generate a prompt for the new content which is output to the second language model, the second language model is trained to generate the new content in response to receiving the prompt for the new content from the first language model and to output the new content to the first language model, and in response to receiving the new content from the second language model, the first language model is trained to generate the NDSL instructions with the new content.

Item 12. The AI-based interface system of any of items 1-11, wherein:

the at least one language model includes a manager model and a plurality of additional language models, the additional language models being trained to perform different actions for the AI notes interface, the manager model is trained to process the prompt to identify the at least one task to be performed and to generate the NDSL instruction for causing the at least one task to be performed in the notes application, the manager model being further trained to process the at least one prompt to select at least one additional language model from the plurality of additional language models to perform at least one action in connection with the at least one task and to generate at least one prompt for causing the at least one of language model to perform the at least one action, the at least one additional language model is trained to process the at least one prompt to generate a result that is output to the manager model, the manager model is trained to generate the NDSL instructions with the result from at least one additional language model.

Item 13. A method for providing an artificial intelligence (AI)-based interface for a notes application, the method comprising:

receiving a prompt via a user interface (UI) component of an interface client, the prompt being in a natural language format and defining at least one task to be performed in the notes application;

sending, over a communication network, the prompt to an AI notes interface including at least one language model, the prompt being provided to at least one language model as input, the at least one language model being trained to process the prompt to identify the at least one task to be performed and to generate notes domain-specific language (NDSL) instructions for execution in the notes application to perform the task, the at least one language model providing the NDSL instructions as an output, the NDSL instructions being based on a NDSL framework implemented for the notes application;

receiving, over the communication network, the output from the at least one language model including the NDSL instructions; and executing the NDSL instructions using a NDSL handler in the notes application to perform the at least one task indicated by the prompt.

Item 14. The method of item 14, wherein:

the at least one task includes adding new content to a note in the notes application, the at least one language model is trained to generate the new content, and the output of the at least one language model includes a NDSL instruction for adding the new content to the note of the notes application.

Item 15. The method of any of items 13-14, wherein the new content includes at least one of a summary of content of the element and a rewrite of the content of the note in a predetermined tone.

Item 16. The method of any of items 13-15, wherein:

the new content is generated from existing content of the note, the NDSL instructions include instructions for retrieving the existing content of the page, and wherein the method further comprises:

receiving the NDSL instructions for retrieving the existing content of the page, in response to receiving the NDSL instructions for retrieving the existing content of the page, sending the existing content to the at least one language application over the communication network; and in response to receiving the existing content of the page, the at least one language model generates the new content from the existing content.

Item 17. The method of any of items 13-16, wherein:

the at least one language model includes at least a first language model and a second language model, and the first language model is trained to process the prompt to identify the at least one task to be performed and to generate the NDSL instruction for causing the at least one task to be performed in the notes application, the first language model being further trained to process the at least one prompt to determine when new content is required as part of the at least one task and to generate a prompt for the new content which is output to the second language model, the second language model is trained to generate the new content in response to receiving the prompt for the new content from the first language model and to output the new content to the first language model, and in response to receiving the new content from the second language model, the first language model is trained to generate the NDSL instructions with the new content.

Item 18. A non-transitory computer readable medium on which are stored instructions that, when executed, cause a programmable device to perform functions of:

receiving a prompt via a user interface (UI) component of an interface client, the prompt being in a natural language format and defining at least one task to be performed in a notes application;

sending, over a communication network, the prompt to an AI notes interface including at least one language model, the prompt being provided to at least one language model as input, the at least one language model being trained to process the prompt to identify the at least one task to be performed and to generate notes domain-specific language (NDSL) instructions for execution in the notes application to perform the task, the at least one language model providing the NDSL instructions as an output, the NDSL instructions being based on a NDSL framework implemented for the notes application;

receiving, over the communication network, the output from the at least one language model including the NDSL instructions; and executing the NDSL instructions using a NDSL handler in the notes application to perform the at least one task indicated by the prompt.

Item 19. The non-transitory computer readable medium of item 18, wherein:

the at least one task includes adding new content to a note of the notes application, the new content being at least one of a summary of content and a rewrite of content, and the at least one language model is trained to generate the new content.

Item 20. The non-transitory computer readable medium of any of items 18-19, wherein:

the at least one language model includes at least a first language model and a second language model, and the first language model is trained to process the prompt to identify the at least one task to be performed and to generate the NDSL instruction for causing the at least one task to be performed in the notes application, the first language model being further trained to process the at least one prompt to determine when new content is required as part of the at least one task and to generate a prompt for the new content which is output to the second language model, the second language model is trained to generate the new content in response to receiving the prompt for the new content from the first language model and to output the new content to the first language model, and in response to receiving the new content from the second language model, the first language model is trained to generate the NDSL instructions with the new content.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An artificial intelligence (AI) interface system for a notes application comprising:

a processor; and a memory in communication with the processor, the memory comprising executable instructions that, when executed by the processor alone or in combination with other processors, cause the AI interface system to perform operations of:

receiving a prompt via an AI interface of the notes application, the prompt defining at least one task to be performed in the notes application, the notes application implementing a hierarchical scheme for managing content of the notes application, the hierarchical scheme including a notebook configured to store information associated with a topic, a section of the notebook configured to store the information associated with a sub-topic of the topic, and a page of the section configured with a canvas area for storing the content of a note of the page;

sending, over a communication network, the prompt to an AI notes interface model of the AI interface system, the prompt being provided to the AI notes interface model as input, the AI notes interface model being trained to:

process the prompt to identify the at least one task to be performed, generate new content or cause the new content to be generated based on the at least one task, and generate notes domain-specific language (NDSL) instructions for execution in the notes application to perform the at least one task with the new content, the at least one language model providing the NDSL instructions and the new content as an output, the NDSL instructions being based on a NDSL framework implemented for the notes application, wherein the NDSL framework defines terminology, functions, variables, syntax, and protocols that enable features and functionality of the notes application to be accessed and controlled from outside of the notes application;

receiving, over the communication network, at the notes application, the output including the NDSL instructions from the at least one language model; and executing the NDSL instructions with the new content using a NDSL handler in the notes application to perform the at least one task indicated by the prompt.

2. The AI interface system of claim 1, wherein the prompt is in a natural language format.

3. The AI interface system of claim 1, wherein the at least one task includes adding a new element to the notes application, the new element being at least one of a new note, a new notebook, a new section, and a new page.

4. The AI interface system of claim 1, wherein:

the at least one task includes adding the new content to the note of the notes application, the at least one language model is trained to generate the new content, and the output of the at least one language model includes the NDSL instructions for adding the new content to the note of the notes application.

5. The AI interface system of claim 4, wherein:

the new content includes a summary of the content of the note, the at least one language model is trained to generate the summary of the content of the note, and the output of the at least one language model includes the NDSL instructions for adding the summary to the note.

6. The AI interface system of claim 4, wherein:

the new content includes a rewrite of the content of the note with a predetermined tone, the at least one language model is trained to generate the rewrite of the content of the note with the predetermined tone, and the output of the at least one language model includes the NDSL instructions for adding the rewrite to the note.

7. The AI interface system of claim 4, wherein:

the new content is generated from existing content of the note, the NDSL instructions include instructions for retrieving the existing content of the note, and the memory further includes executable instructions that, when executed by the processor alone or in combination with other processors, cause the AI interface system to perform operations of:

receiving the NDSL instructions for retrieving the existing content of the page, in response to receiving the NDSL instructions for retrieving the existing content of the page, sending the existing content to the at least one language model over the communication network; and in response to receiving the existing content of the page, the at least one language model generates the new content from the existing content.

8. The AI interface system of claim 1, wherein:

the at least one task includes retrieving the new content and adding the new content to the note in the notes application, the at least one language model is trained to retrieve the new content from an external source, and the output of the at least one language model includes the NDSL instructions for adding the new content to the note.

9. The AI interface system of claim 1, wherein:

the at least one task includes generating a list of synonyms for a word, the at least one language model is trained to generate the list of synonyms for the word, and the output of the at least one language model includes the NDSL instructions for displaying the list in the AI interface.

10. The AI interface system of claim 1, wherein:

the at least one language model is trained to determine suggested actions to perform based at least in part on the at least one task indicated by the prompt, and the output includes at least one NDSL instruction for displaying the suggested actions in the AI interface.

11. The AI interface system of claim 1, wherein:

the at least one language model includes at least a first language model and a second language model, the first language model is trained to process the prompt to identify the at least one task to be performed and to generate the NDSL instruction for causing the at least one task to be performed in the notes application, the first language model being further trained to process the prompt to determine when the new content is required as part of the at least one task and to generate the prompt for the new content which is output to the second language model, the second language model is trained to generate the new content in response to receiving the prompt for the new content from the first language model and to output the new content to the first language model, and in response to receiving the new content from the second language model, the first language model is trained to generate the NDSL instructions with the new content.

12. The AI interface system of claim 1, wherein:

the at least one language model includes a manager model and a plurality of additional language models, the additional language models being trained to perform different actions for the AI notes interface model, the manager model is trained to process the prompt to identify the at least one task to be performed and to generate the NDSL instruction for causing the at least one task to be performed in the notes application, the manager model being further trained to process the prompt to select at least one additional language model from the plurality of additional language models to perform at least one action in connection with the at least one task and to generate the prompt for causing the at least one language model to perform the at least one action, the at least one additional language model is trained to process the prompt to generate a result that is output to the manager model, and the manager model is trained to generate the NDSL instructions with the result from the at least one additional language model.

13. A method for providing an artificial intelligence (AI) interface for a notes application, the method comprising:

receiving a prompt via an AI interface of the notes application, the prompt defining at least one task to be performed in the notes application, the notes application implementing a hierarchical scheme for managing content of the notes application, the hierarchical scheme including a notebook configured to store information associated with a topic, a section of the notebook configured to store the information associated with a sub-topic of the topic, and a page of the section configured with a canvas area for storing the content of a note of the page;

sending, over a communication network, the prompt to an AI notes interface model of the AI interface, the prompt being provided to the AI notes interface model as input, the AI notes interface model being trained to:

process the prompt to identify the at least one task to be performed, generate new content or cause the new content to be generated based on the at least one task, and generate notes domain-specific language (NDSL) instructions for execution in the notes application to perform the at least one task with the new content, the at least one language model providing the NDSL instructions and the new content as an output, the NDSL instructions being based on a NDSL framework implemented for the notes application, wherein the NDSL framework defines terminology, functions, variables, syntax, and protocols that enable features and functionality of the notes application to be accessed and controlled from outside of the notes application;

receiving, over the communication network, at the notes application, the output including the NDSL instructions from the at least one language model; and executing the NDSL instructions with the new content using a NDSL handler in the notes application to perform the at least one task indicated by the prompt.

14. The method of claim 13, wherein:

the at least one task includes adding new content to a note in the notes application, the at least one language model is trained to generate the new content, and the output of the at least one language model includes a NDSL instruction for adding the new content to the note of the notes application.

15. The method of claim 14, wherein the new content includes at least one of a summary of the content of the note and a rewrite of the content of the note in a predetermined tone.

16. The method of claim 14, further comprising:

receiving the NDSL instructions for retrieving existing content of the page;

sending the existing content to the at least one language model over the communication network; and generating, by the at least one language model, the new content from the existing content of the note.

17. The method of claim 13, wherein:

the at least one language model includes at least a first language model and a second language model, the first language model is trained to process the prompt to identify the at least one task to be performed and to generate the NDSL instruction for causing the at least one task to be performed in the notes application, the first language model being further trained to process the prompt to determine when new content is required as part of the at least one task and to generate a prompt for the new content which is output to the second language model, the second language model is trained to generate the new content in response to receiving the prompt for the new content from the first language model and to output the new content to the first language model, and in response to receiving the new content from the second language model, the first language model is trained to generate the NDSL instructions with the new content.

18. A non-transitory computer readable medium on which are stored instructions that, when executed, cause a programmable device to perform functions of:

receiving a prompt via an AI interface of a notes application, the prompt defining at least one task to be performed in the notes application, the notes application implementing a hierarchical scheme for managing content of the notes application, the hierarchical scheme including a notebook configured to store information associated with a topic, a section of the notebook configured to store the information associated with a sub-topic of the topic, and a page of the section configured with a canvas area for storing the content of a note of the page;

sending, over a communication network, the prompt to an AI notes interface model of an AI interface system, the prompt being provided to the AI notes interface model as input, the AI notes interface model being trained to:

process the prompt to identify the at least one task to be performed, generate new content or cause the new content to be generated based on the at least one task, and generate notes domain-specific language (NDSL) instructions for execution in the notes application to perform the at least one task with the new content, the at least one language model providing the NDSL instructions and the new content as an output, the NDSL instructions being based on a NDSL framework implemented for the notes application, wherein the NDSL framework defines terminology, functions, variables, syntax, and protocols that enable features and functionality of the notes application to be accessed and controlled from outside of the notes application;

receiving, over the communication network, at the notes application, the output including the NDSL instructions from the at least one language model; and executing the NDSL instructions with the new content using a NDSL handler in the notes application to perform the at least one task indicated by the prompt.

19. The non-transitory computer readable medium of claim 18, wherein:

the at least one task includes adding the new content to the note of the notes application, the new content being at least one of a summary of the content and a rewrite of the content, and the at least one language model is trained to generate the new content.

20. The non-transitory computer readable medium of claim 18, wherein:

the at least one language model includes at least a first language model and a second language model, the first language model is trained to process the prompt to identify the at least one task to be performed and to generate the NDSL instruction for causing the at least one task to be performed in the notes application, the first language model being further trained to process the prompt to determine when new content is required as part of the at least one task and to generate the prompt for the new content which is output to the second language model, the second language model is trained to generate the new content in response to receiving the prompt for the new content from the first language model and to output the new content to the first language model, and in response to receiving the new content from the second language model, the first language model is trained to generate the NDSL instructions with the new content.

* * * * *